(12) United States Patent
Feng et al.

(10) Patent No.: US 11,991,582 B2
(45) Date of Patent: May 21, 2024

(54) TERMINAL IDENTIFICATION METHOD AND APPARATUS

(71) Applicant: Huawei Technologies Co., Ltd., Shenzhen (CN)

(72) Inventors: Ligang Feng, Beijing (CN); Shuping Peng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 167 days.

(21) Appl. No.: 17/552,094

(22) Filed: Dec. 15, 2021

(65) Prior Publication Data

US 2022/0191761 A1 Jun. 16, 2022

(30) Foreign Application Priority Data

Dec. 16, 2020 (CN) .......................... 202011492664.6

(51) Int. Cl.
*H04W 36/30* (2009.01)
*H04W 36/00* (2009.01)
(Continued)

(52) U.S. Cl.
CPC ....... *H04W 36/30* (2013.01); *H04W 36/0083* (2013.01); *H04L 47/80* (2013.01); *H04L 67/303* (2013.01)

(58) Field of Classification Search
CPC ..... H04W 36/24; H04W 36/26; H04W 36/30; H04W 36/00; H04W 36/0005;
(Continued)

(56) References Cited

U.S. PATENT DOCUMENTS

| | | | | |
|---|---|---|---|---|
| 2007/0165537 A1* | 7/2007 | Magnusson | ........... | H04W 48/18 370/254 |
| 2008/0034409 A1* | 2/2008 | O'Rourke | ............. | H04W 12/06 705/40 |

(Continued)

FOREIGN PATENT DOCUMENTS

| | | | | |
|---|---|---|---|---|
| CN | 110650075 A | | 1/2020 | |
| CN | 114095158 | * | 2/2022 | ......... H04L 41/0893 |

(Continued)

OTHER PUBLICATIONS

"IEEE Standard for Information Technology—Telecommunications and information exchange between systems Local and metropolitan area networks—Specific requirements; Part 11: Wireless LAN Medium Access Control (MAC) and Physical Layer (PHY) specifications; Amendment 8: IEEE 802.11 Wireless Network Management," IEEE Std 802.11v™—2011, Total 433 pages, Institute of Electrical and Electronics Engineers, New York, New York (Feb. 2011).

(Continued)

*Primary Examiner* — Warner Wong
(74) *Attorney, Agent, or Firm* — Leydig, Voit & Mayer, Ltd.

(57) ABSTRACT

This application provides a terminal identification method and an apparatus, and relates to the communications field. The terminal identification method includes: a communications device generates and sends a data packet; and after receiving the data packet, a network device determines, based on terminal information included in an internet protocol (IP) packet header of the data packet, a terminal type of a terminal corresponding to the terminal information.

19 Claims, 19 Drawing Sheets

(51) Int. Cl.
*H04L 47/80* (2022.01)
*H04L 67/303* (2022.01)

(58) Field of Classification Search
CPC ......... H04W 36/0083; H04W 36/0087; H04W 28/0215; H04W 8/18; H04L 47/80; H04L 67/30; H04L 67/303; H04L 67/306; H04L 45/308; H04L 41/0803
See application file for complete search history.

(56) References Cited

U.S. PATENT DOCUMENTS

| | | | |
|---|---|---|---|
| 2009/0037587 A1* | 2/2009 | Yoshimi | H04L 63/045 709/227 |
| 2014/0199961 A1 | 7/2014 | Mohammed et al. | |
| 2015/0031367 A1 | 1/2015 | Singh et al. | |
| 2019/0124550 A1* | 4/2019 | Hori | H04W 8/24 |
| 2022/0263823 A1* | 8/2022 | Li | G06F 21/44 |

FOREIGN PATENT DOCUMENTS

| | | | | |
|---|---|---|---|---|
| EP | 2495926 A1 | 9/2012 | | |
| KR | 20180018128 | * | 2/2018 | ........... H04L 67/303 |
| WO | 2015174644 A1 | 11/2015 | | |
| WO | 2017028288 A1 | 2/2017 | | |

OTHER PUBLICATIONS

CN/202011492664.6, Office Action and Search Report, Mailing Date Mar. 12, 2024.

* cited by examiner

TERMINAL IDENTIFICATION METHOD AND APPARATUS

CROSS-REFERENCE TO RELATED APPLICATIONS

This application claims priority to Chinese Patent Application No. 202011492664.6, filed on Dec. 16, 2020, which is hereby incorporated by reference in its entirety.

TECHNICAL FIELD

This application relates to the communications field, and in particular, to a terminal identification method and an apparatus.

BACKGROUND

Generally, a terminal is connected to an optical network terminal (ONT) at Layer 2, and the ONT may identify a terminal type based on a medium access control (MAC) address of the terminal. If an operator obtains the terminal type, the operator may perform user profiling on users, for example, collecting statistics on user traffic, accessed applications, and user terminal types, to provide differentiated services, such as package promotion, for different users.

However, a network device cannot obtain terminal information in a data transmission process, and therefore cannot identify the terminal type. Therefore, how to accurately identify the terminal type becomes an urgent problem to be resolved.

SUMMARY

This application provides a terminal identification method and an apparatus, to resolve a problem that a network device cannot obtain terminal information in a data transmission process, and therefore cannot identify a terminal type.

According to a first aspect, this application provides a terminal identification method. The method may be applied to a network device, or the method may be applied to a communications apparatus that can support a network device in implementing the method. For example, the communications apparatus includes a chip system. The terminal identification method includes: The network device receives a data packet, and determines, based on terminal information included in an Internet Protocol (IP) packet header of the data packet, a terminal type of a terminal corresponding to the terminal information. Compared with a conventional technology in which a network device cannot obtain terminal information in a process of data packet transmission by the network device, in the technical solution provided in embodiments of this application, the IP packet header of the data packet includes the terminal information, so that the network device that receives the data packet can obtain the terminal information, and obtain the terminal type of the terminal based on the terminal information.

In a possible implementation, the IP packet header further includes a type identifier. The type identifier is used to indicate a type of the terminal information, and the type of the terminal information includes a MAC address and/or an international mobile equipment identity (IMEI). The network device may determine the type of the terminal information by using the type identifier, and identify the terminal type as quickly as possible based on the terminal information. This reduces matching time for terminal identification and improves efficiency of the terminal identification. The terminal type may include at least one of a manufacturer and a terminal model of the terminal. The network device may obtain the manufacturer of the terminal based on the MAC address, and obtain the terminal model of the terminal based on the IMEI. This further improves accuracy of identifying the terminal by the network device.

In another possible implementation, the terminal information includes an organizationally unique identifier. That the network device determines the terminal type of the terminal based on the terminal information may include: The network device obtains the terminal type of the terminal based on a first correspondence including the organizationally unique identifier and the terminal type. After receiving the data packet, the network device may obtain manufacturer information of the terminal based on the organizationally unique identifier in the data packet.

In another possible implementation, that the network device determines the terminal type of the terminal based on the terminal information may include: The network device obtains the terminal type of the terminal based on a second correspondence including the terminal information and the terminal type. It should be noted that the second correspondence may be a correspondence between the terminal type and at least some values in the terminal information. The network device matches the at least some values in the terminal information with the second correspondence, to obtain the terminal type of the terminal.

In another possible implementation, the data packet may further include a user identifier. After the network device determines the terminal type of the terminal based on the terminal information, the terminal identification method may further include: The network device generates a user profile based on the user identifier and the terminal type, where the user profile represents a correspondence between the user identifier and the terminal type. The user profile may be used by an operator to which the network device belongs to perform refined control on different terminal types. For example, the operator provides an internet access service with a higher priority for an exemplary terminal, and the exemplary terminal may be a terminal for which a value-added service whose price is greater than or equal to a preset threshold is purchased. In addition, the user profile may be provided by the operator for a service provider, so that the service provider provides differentiated value-added services for a user based on the user profile, to improve user experience.

In another possible implementation, the data packet may further include a user agent. After the network device determines the terminal type of the terminal based on the terminal information, the terminal identification method may further include: The network device determines an operating system of the terminal and a version number of the operating system based on the user agent. Based on the terminal type in the data packet, the network device may obtain the operating system and the version number of the terminal based on the user agent, to assist in performing the terminal identification based on the terminal information. This further improves accuracy of the terminal identification.

In another possible implementation, the terminal identification method may further include: displaying the terminal type, the operating system of the terminal, and the version number of the operating system, so that a user can intuitively view the terminal type, and further determine whether the terminal type is accurate based on the operating system and the version number of the operating system.

In another possible implementation, the terminal identification method may further include: The network device receives status information sent by a first access device, where the status information includes a signal-to-noise ratio of a connection signal between the terminal and the first access device; and the network device sends a handover instruction to the first access device based on the terminal type and the signal-to-noise ratio, so that the terminal may be handed over from the first access device to a second access device based on the handover instruction. In all coverage areas of the access device to which the network device is connected, the network device may determine, based on the status information of the terminal, whether to hand over the terminal from the access device to which the terminal is connected, and a network to which the terminal is connected is smooth without manual selection by the user.

According to a second aspect, this application provides a terminal identification method, where the method may be applied to a terminal, or the method may be applied to a communications apparatus that can support a terminal in implementing the method. For example, the communications apparatus includes a chip system. The terminal identification method includes: The terminal generates and sends a data packet, so that a network device that receives the data packet identifies a terminal type based on terminal information in an IP packet header of the data packet.

With reference to any one of the second aspect or the possible implementations of the first aspect, in a possible implementation, a base packet header or an extension packet header of the IP packet header includes the terminal information. Because at least one of the base packet header and the extension packet header of the data packet includes the terminal information, the terminal information is prevented from being overwritten by other information from a network device that forwards the data packet, so that the network device that receives the data packet can obtain the terminal information and perform terminal type identification.

With reference to any one of the second aspect or the possible implementations of the first aspect, in another possible implementation, the extension packet header includes a hop-by-hop options header and/or a destination options header. When the extension packet header includes the terminal information, the terminal information may be carried in any one or more of the hop-by-hop options header and the destination options header, so that the terminal information is not overwritten in a transmission process by information from the network device that forwards the data packet, and the network device that receives the data packet can obtain the terminal type of the terminal based on the terminal information in the data packet, to identify the terminal.

According to a third aspect, this application provides a communications apparatus. The communications apparatus may be applied to a network device, and the communications apparatus includes a communications module and a processing module. The communications module is configured to receive a data packet, where an IP packet header of the data packet includes terminal information. The processing module is configured to determine, based on the terminal information, a terminal type of a terminal corresponding to the terminal information.

With reference to the communications apparatus provided in the third aspect, in a possible implementation, a base packet header or an extension packet header of the IP packet header includes the terminal information.

In another possible implementation, the extension packet header includes a hop-by-hop options header and/or a destination options header.

With reference to the communications apparatus provided in the third aspect, in another possible implementation, the IP packet header further includes a type identifier, and the type identifier is used to indicate a type of the terminal information. The type of the terminal information includes a MAC address and/or an IMEI.

With reference to the communications apparatus provided in the third aspect, in another possible implementation, the terminal information includes an organizationally unique identifier. The processing module is configured to obtain the terminal type of the terminal based on a first correspondence including the organizationally unique identifier and the terminal type.

With reference to the communications apparatus provided in the third aspect, in a possible implementation, the processing module is configured to obtain the terminal type of the terminal based on a second correspondence including the terminal information and the terminal type.

With reference to the communications apparatus provided in the third aspect, in another possible implementation, the processing module is further configured to generate a user profile based on the user identifier and the terminal type, where the user profile represents a correspondence between the user identifier and the terminal type.

With reference to the communications apparatus provided in the third aspect, in another possible implementation, the processing module is further configured to determine an operating system of the terminal and a version number of the operating system based on a user agent.

With reference to the communications apparatus provided in the third aspect, in a possible implementation, the communications apparatus further includes a display module. The display module is configured to display the terminal type, the operating system of the terminal, and the version number of the operating system.

With reference to the communications apparatus provided in the third aspect, in another possible implementation, the communications module is further configured to: receive status information sent by a first access device, where the status information includes a signal-to-noise ratio of a connection signal between the terminal and the first access device; and send a handover instruction to the first access device based on the terminal type and the signal-to-noise ratio, where the handover instruction is used to instruct the terminal to be handed over from the first access device to a second access device.

With reference to the communications apparatus provided in the third aspect, in another possible implementation, the terminal type includes at least one of a manufacturer and a terminal model of the terminal.

According to a fourth aspect, this application further provides another communications apparatus, which may be applied to a communications device. The communications apparatus includes a processing module and a communications module. The processing module is configured to generate a data packet, where an Internet Protocol IP packet header of the data packet includes terminal information. The communications module is configured to send the data packet.

With reference to the communications apparatus provided in the fourth aspect, in a possible implementation, a base packet header or an extension packet header of the IP packet header includes the terminal information.

With reference to the communications apparatus provided in the fourth aspect, in another possible implementation, the extension packet header includes a hop-by-hop options header and/or a destination options header.

According to a fifth aspect, this application provides a network device, where the network device includes at least one processor and a memory, and the memory is configured to store a group of computer instructions. When executing the group of computer instructions, the processor performs the operation steps of the terminal identification method according to any one of the first aspect or the possible implementations of the first aspect.

According to a sixth aspect, this application provides a communications device, where the communications device includes at least one processor and a memory, and the memory is configured to store a group of computer instructions. When executing the group of computer instructions, the processor performs the operation steps of the terminal identification method according to any one of the second aspect or the possible implementations of the second aspect.

According to a seventh aspect, this application provides a computer-readable storage medium, including computer software instructions. When the computer software instructions are run on the computing device, the computing device is enabled to perform the operation steps of the terminal identification method according to any one of the first aspect or the possible implementations of the first aspect, or any one of the second aspect or the possible implementations of the second aspect.

According to an eighth aspect, this application provides a computer program product. When the computer program product runs on a computer, a computing device is enabled to perform the operation steps of the terminal identification method according to any one of the first aspect or the possible implementations of the first aspect, or any one of the second aspect or the possible implementations of the second aspect.

According to a ninth aspect, this application provides a communications system. The communications system includes a network device and a communications device. The network device may be the network device according to the third aspect or any optional manner of the third aspect or the network device according to the fifth aspect or any optional manner of the fifth aspect. The communications device may be the communications device according to the fourth aspect or any optional manner of the fourth aspect or the network device according to the sixth aspect or any optional manner of the sixth aspect.

According to a tenth aspect, a chip is provided, including a memory and a processor, where the memory is configured to store computer instructions, and the processor is configured to invoke and run the computer instructions from the memory, to perform the operation steps of the terminal identification method according to any one of the first aspect or the possible implementations of the first aspect, or according to any one of the second aspect or the possible implementations of the second aspect.

Based on the implementations provided in the foregoing aspects, this application may provide more implementations through further combination.

DETAILED DESCRIPTION

In the specification, claims, and accompanying drawings of this application, terms such as "first", "second", and "third" are intended to distinguish between different objects but not to limit a particular order.

In embodiments of this application, the word such as "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the term such as "example" or "for example" is intended to present a related concept in an exemplary manner.

The following describes the implementations of the embodiments of this application in detail with reference to accompanying drawings.

Figure 1A:
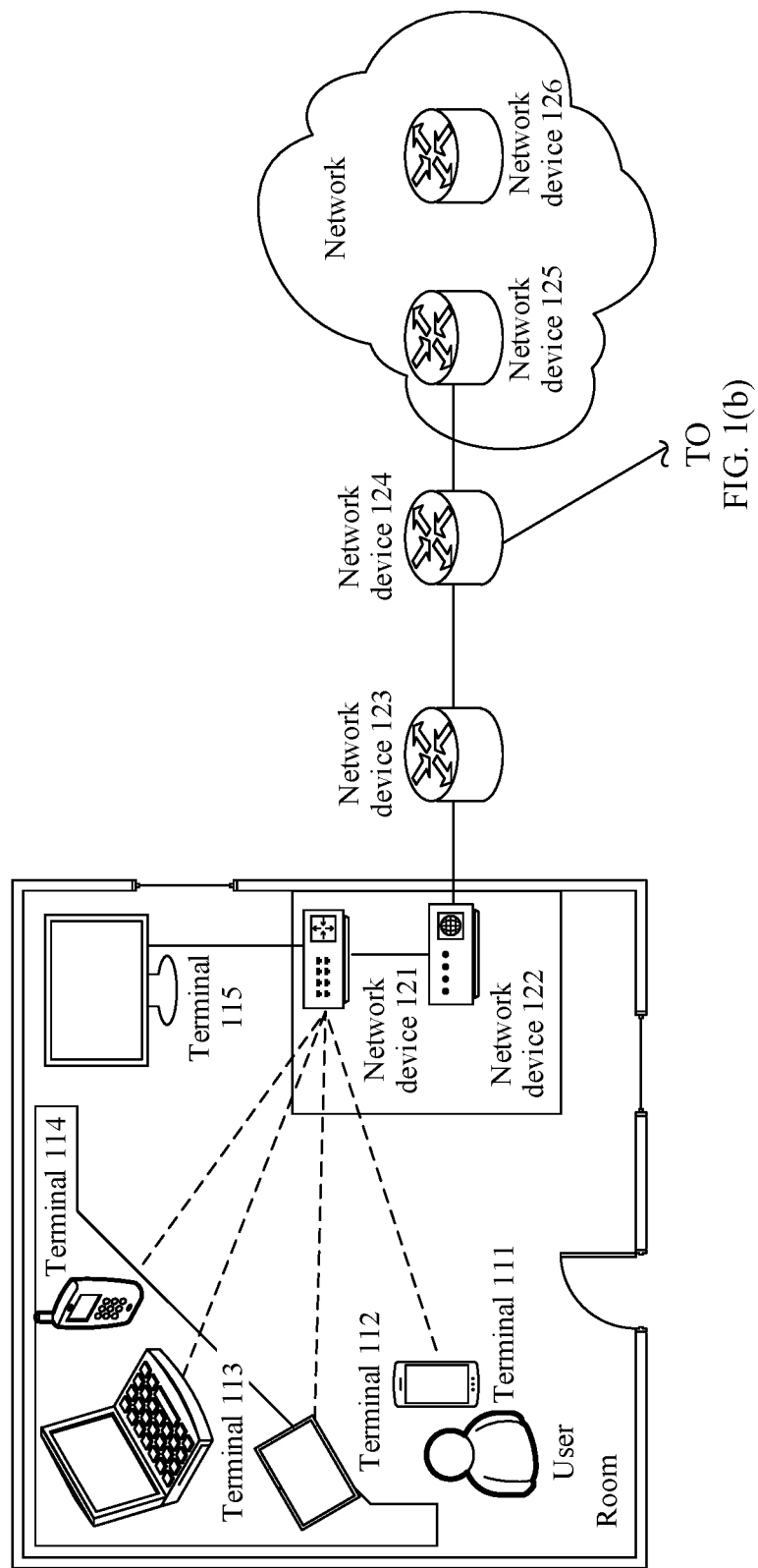
FIG. 1(a) to FIG. 1(c) are schematic diagrams of a structure of a communications network according to this application.
Figure 1B:
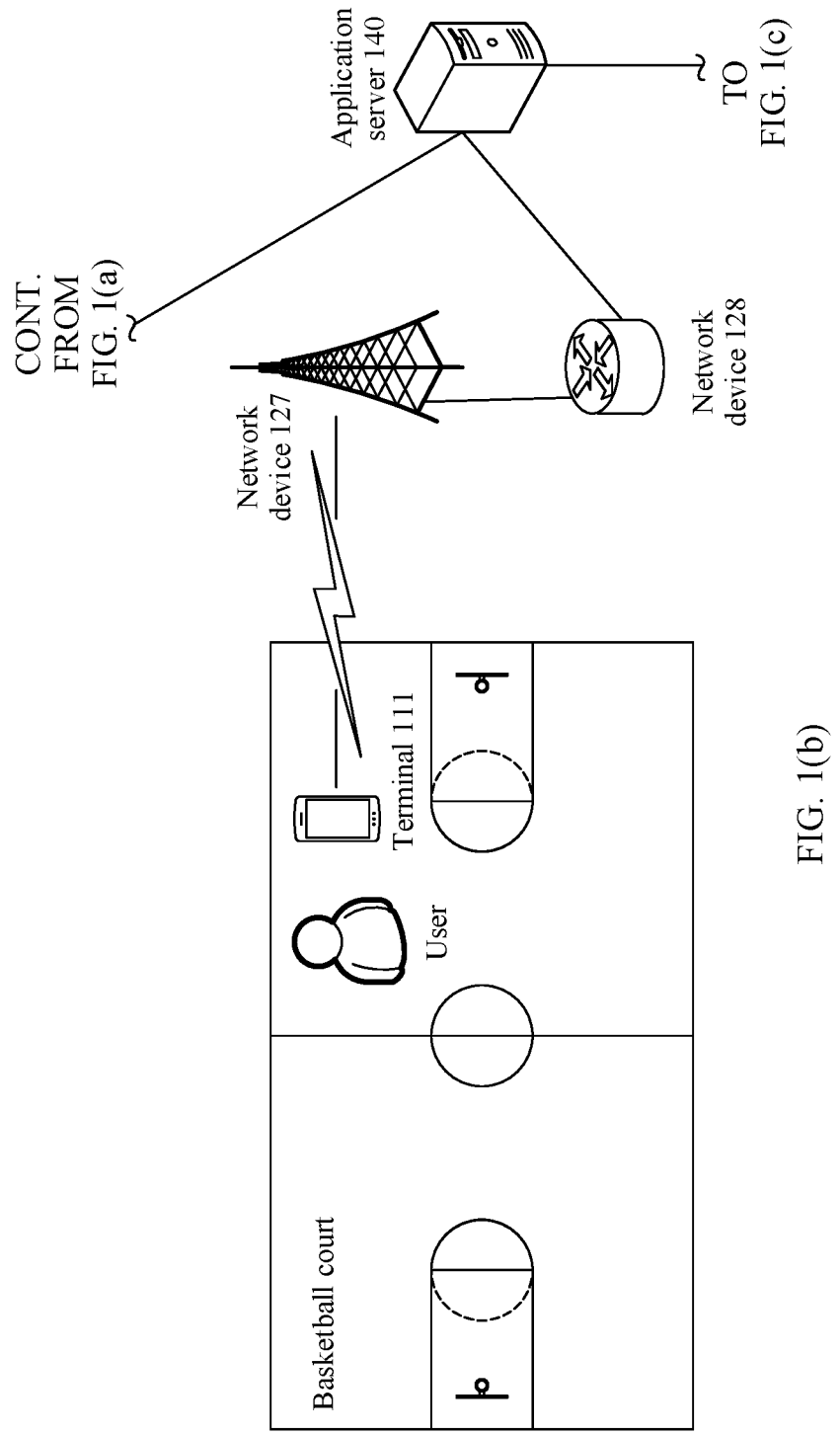
Figure 1C:
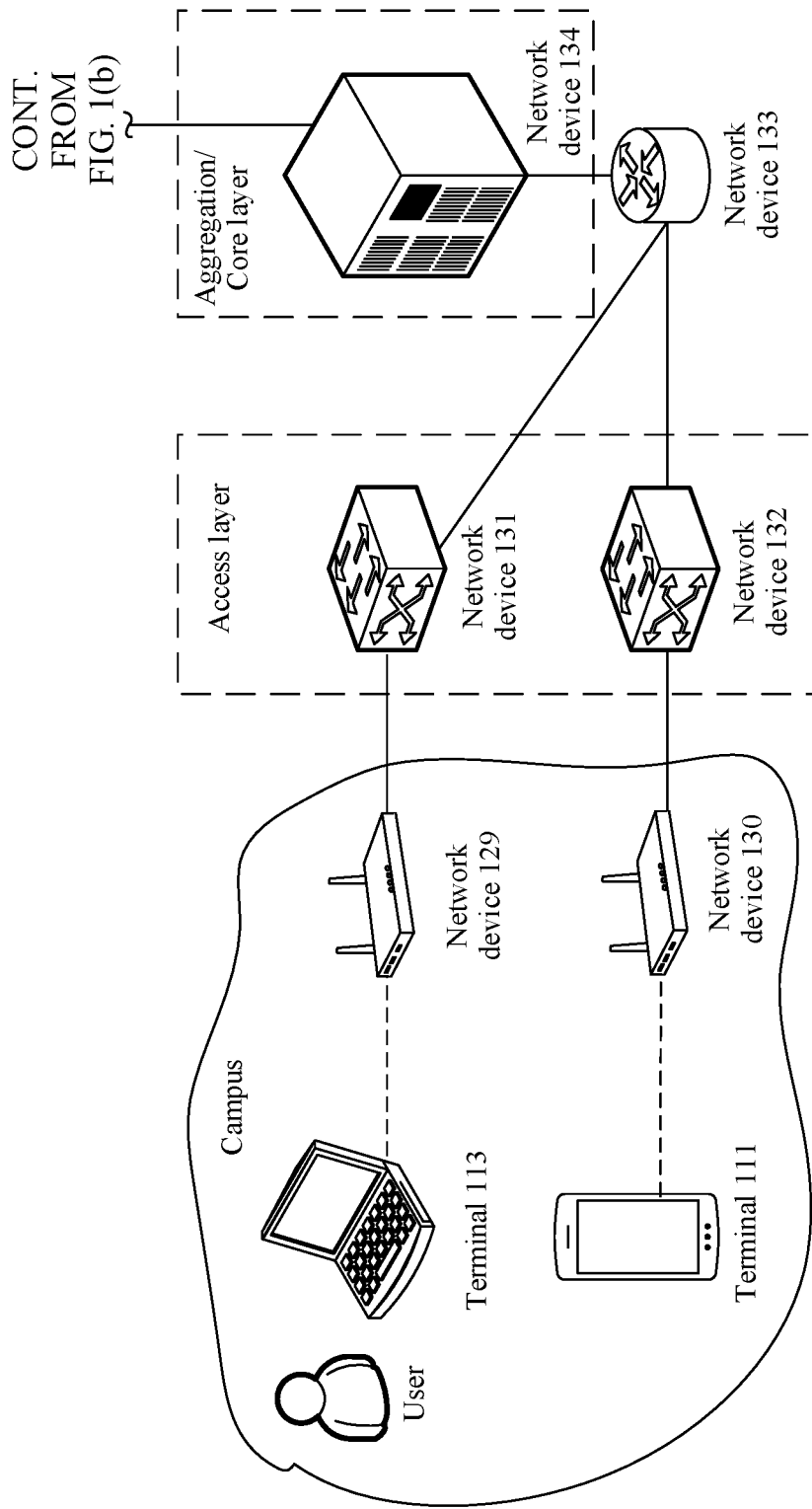

FIG. 1(a) to FIG. 1(c) are schematic diagrams of a structure of a communications network according to this application. The communications network includes at least one terminal (such as terminals 111 to 115 shown in FIG. 1(a) to FIG. 1(c)) and an internet service provider (ISP) network. An ISP is an operator that provides internet access services, information services, and value-added services for a large quantity of users. The ISP network may include at least one network device (such as network devices 121 to 134 shown in FIG. 1(a) to FIG. 1(c)).

In some embodiments, the network device may be a user-side device close to a terminal, for example, the network device 121, the network device 122, and the network device 129 to the network device 132. For example, the network device 121 may be an ONT, and the network device 122 may be an optical line terminal (OLT). Both the network device 129 and the network device 130 may be wireless access points (APs), such as, wireless routers, and both the network device 131 and the network device 132 may be switches connected to the wireless routers.

In some other embodiments, the network device may alternatively be a network-side device close to an application server. The network-side device is a network device that is provided by the ISP and that is configured to forward and process a data packet from the terminal. For example, the network device 123 may be a broadband remote access server (BRAS), the network device 124 may be a core router (CR), the network device 125 and the network device 126 may be provider edges (PEs) over a network, the network device 133 may be an access point controller (AC), and the network device 134 may be a layer 3 switch.

The terminal (Terminal) may also be referred to as a terminal device, user equipment (UE), a mobile station (MS), a mobile terminal (MT), or the like. The terminal may be a mobile phone (such as the terminal 111 shown in FIG. 1(a) to FIG. 1(c)), a portable Android device (such as the terminal 112 shown in FIG. 1(a) to FIG. 1(c)), a computer (such as the terminal 113 shown in FIG. 1(a) to FIG. 1(c)) with a wireless transceiver function, a personal communications service (PCS) telephone (such as the terminal 114 shown in FIG. 1(a) to FIG. 1(c)), a desktop computer (such as the terminal 115 shown in FIG. 1(a) to FIG. 1(c)), a virtual reality (VR) terminal device, an augmented reality (AR) terminal device, a wireless terminal in industrial control, a wireless terminal in self driving, a wireless terminal in remote medical surgery, a wireless terminal in smart grid, a wireless terminal in transportation safety, a wireless terminal in a smart city, a wireless terminal in a smart home, and the like. A specific technology and a specific device form used by the terminal are not limited in the embodiments of this application.

The terminal and the network device may be deployed on land, including indoor (a room shown in FIG. 1(a) to FIG. 1(c)) or outdoor (a basketball court shown in FIG. 1(a) to FIG. 1(c)), handheld, or vehicle-mounted scenarios; or may be deployed on the water; or may be deployed on an airplane, a balloon, and a satellite in the air. Application scenarios of the network device and the terminal are not limited in the embodiments of this application.

FIG. 1(a) to FIG. 1(c) are merely schematic diagrams according to an embodiment of this application. The communications network may further include another terminal and network device, which are not shown in FIG. 1(a) to FIG. 1(c). Quantities of network devices and terminals included in the communications network are not limited in the embodiments of this application.

In some embodiments, a user may establish a communications connection to the network device by using the terminal according to a wireless-fidelity (Wi-Fi) technology, so that the terminal accesses an application server (such as an application server 140 shown in FIG. 1(a) to FIG. 1(c)).

In some other embodiments, a user may further establish a communications connection to a radio access network (RAN) device by using the terminal according to a mobile communications technology, and may access an application server through a radio access network device and another network device. In the basketball court shown in FIG. 1(a) to FIG. 1(c), the terminal 111 accesses the application server 140 through the network device 127 and the network device 128. The network device 127 may be a radio access network device.

The radio access network device is an access device through which the terminal accesses to the mobile communications system in a wireless manner, and may be a base station, an evolved NodeB (eNodeB), a transmission reception point (TRP), a next generation NodeB (gNB) in a 5G mobile communications system, a base station in a future mobile communications system, or an access node in a Wi-Fi system; or may be a module or a unit that completes some functions of a base station, for example, may be a central unit (CU), or may be a distributed unit (DU). For example, the mobile communications technology may be the 4th generation mobile communications technology (4G), or the 5th generation mobile communications technology (5G). A specific technology and a specific device form used by the radio access network device are not limited in the embodiments of this application.

In some other embodiments, the user may further access the application server through a communications connection between the terminal and a wireless access point (AP). In a campus network shown in FIG. 1(a) to FIG. 1(c), the terminal 113 accesses the application server 140 through the network device 129, the network device 131, the network device 133, and the network device 134.

Figure 2:
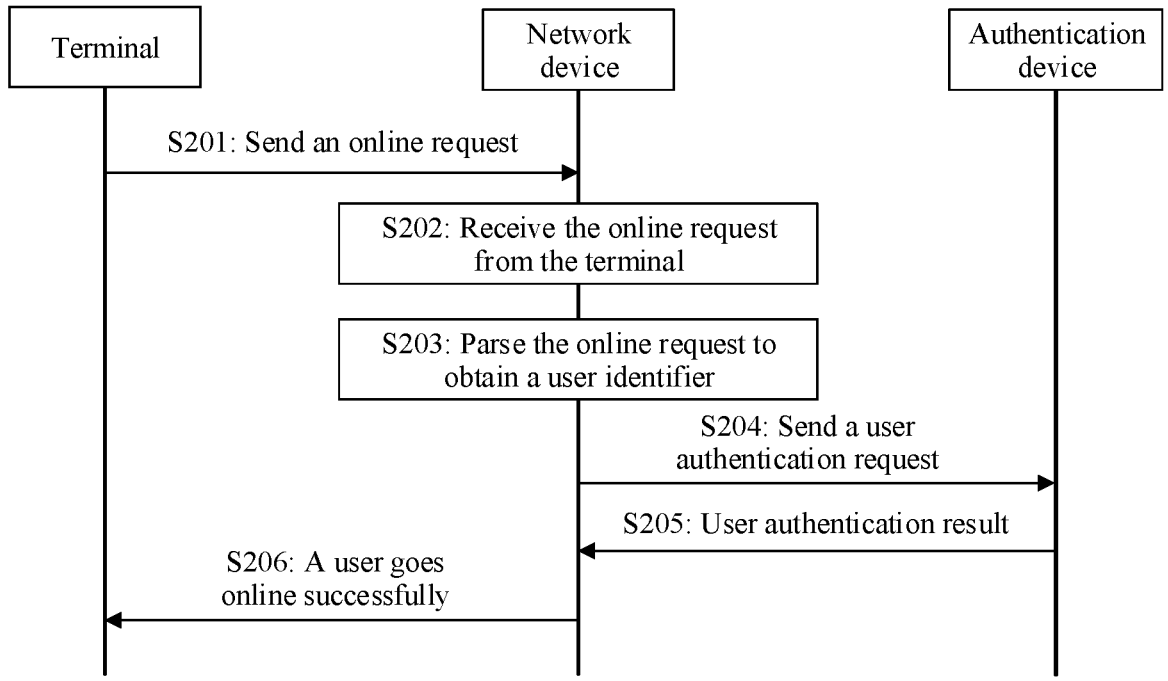
FIG. 2 is a flowchart of an authentication process according to this application.

The terminal needs to be authenticated before accessing the application server. FIG. 2 is a flowchart of an authentication process according to this application. An online authentication process of the terminal may include the following steps.

S201: The terminal sends an online request to the network device.

For example, the online request may be a packet sent based on a Point-to-Point Protocol over Ethernet (PPPoE).

In a broadband scenario, the network device may be a BRAS, for example, the network device 123 shown in FIG. 1(a) to FIG. 1(c).

In a wireless communications scenario, the network device may be a radio access network device. For example, in a 5G communications scenario, the network device 127 shown in FIG. 1(a) to FIG. 1(c) may be a base station.

In a campus network, the network device may be a wireless AP, such as the network device 129 or the network device 130 shown in FIG. 1(a) to FIG. 1(c).

S202: The network device receives the online request from the terminal.

S203: The network device parses the online request to obtain a user name.

For example, the network device parses the PPPoE packet to obtain the user name.

S204: The network device sends a user authentication request to an authentication device.

In the broadband scenario and the wireless communications scenario, the authentication device may be an authentication server that is connected to a network device at Layer 3.

In the campus network, the authentication device may be an AC that manages the AP. The AC may aggregate data from different APs and access an aggregation layer or a core layer. The AC may provide a user access authentication function, such as the network device 132 shown in FIG. 1(a) to FIG. 1(c).

In some embodiments, the network device may further integrate an authentication function. Therefore, after receiving the online request of the terminal, the network device may perform authentication locally on the network device.

S205: The authentication device sends a user authentication result to the network device.

For example, if the authentication device determines that the terminal corresponding to the user name is in arrears, the authentication device determines that the terminal fails to go online. Alternatively, if the authentication device determines that the terminal corresponding to the user name is not in arrears, the authentication device determines that the terminal can connect to a network accessed by the network device.

S206: The network device determines that the user of the terminal successfully goes online.

In a possible implementation, the authentication device may further store the user name and allocate a user address to the terminal, so that when the terminal performs online authentication by using the user name and the user address, the terminal is directly authenticated. This improves internet access efficiency of the user.

Figure 3:
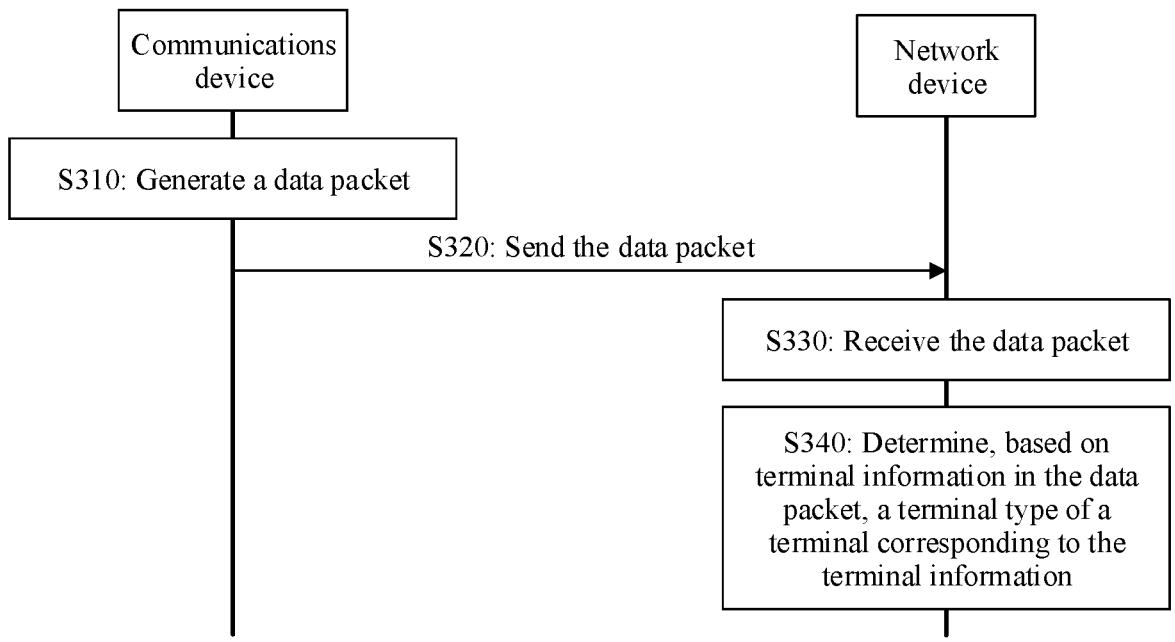
FIG. 3 is a schematic flowchart of a terminal identification method according to this application.

Users of the ISP have different requirements for packages provided by the ISP. To recommend packages for different terminal types when an internet access service, an information service, and a value-added service are provided for the users, the following describes in detail a terminal identification method provided in this application based on the communications network shown in FIG. 1(a) to FIG. 1(c). FIG. 3 is a schematic flowchart of the terminal identification method according to this application. A network device shown in FIG. 3 may be any one of the network device 121 to the network device 134 shown in FIG. 1(a) to FIG. 1(c). The terminal identification method may include the following steps.

S310: A communications device generates a data packet.

The communications device herein may be a terminal or a network device. When the communications device is a network device, the communications device may be a device such as an ONT or a BRAS.

In this embodiment, the data packet includes terminal information. In an example, the terminal device may directly generate the data packet. For example, when the terminal accesses an application server, the data packet may further include an address of the terminal, an address of the application server, and data sent to the application server or information for requesting data from the application server. In another example, the network device may generate the data packet based on information about a terminal device accessing the network device. For example, the communications device may be an ONT, and the ONT generates the data packet. The data packet includes a MAC address of the terminal device accessing to the ONT, and the MAC address may indicate a terminal type of the terminal device.

The terminal information is used by the network device to determine a terminal type of a terminal corresponding to the terminal information. For example, the terminal information may be referred to as application-aware IPv6 networking (APN6) information. For example, the terminal type may include at least one of a manufacturer and a terminal model of the terminal. For example, a manufacturer may be understood as a brand vendor to which a terminal belongs, and a terminal model may be understood as models (for example, P20 or S9) of different terminals of a same brand vendor.

Figure 4:
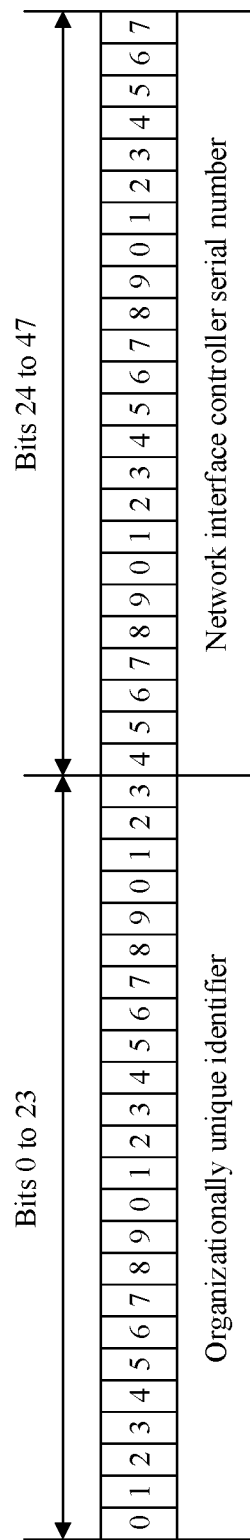
FIG. 4 is a schematic diagram of a MAC address according to this application.

In a first possible design, the terminal information may be a MAC address. As shown in FIG. 4, the MAC address includes 48 bits (6 bytes). Bits 0 to 23 (the first three bytes) in the 48 bits represent organizationally unique identifiers (OUIs) allocated to different manufacturers by the Institute of Electrical and Electronics Engineers (IEEE), where the OUI may be used to indicate a manufacturer of a terminal. Bits 24 to 47 (the last three bytes) in the 48 bits represent network interface controller (NIC) serial numbers set by a manufacturer for different network adapters, so that another device can distinguish different network adapters based on the NIC serial numbers.

In a second possible design, the terminal information may be an IMEI. The IMEI represents a unique identifier allocated by a Global System for Mobile Communications Association (GSMA) to a terminal, and may indicate a terminal model of the terminal.

In a third possible design, the terminal information may be a value of the terminal type. For example, if the value of the terminal type is "HW 10", the terminal type of the terminal is "HW M10".

The terminal information may be carried in a packet header of the data packet. The data packet may be an IPv6 data packet or an IPv4 data packet.

In a first possible implementation, the terminal information may be carried in a base packet header of the IPv6 data packet or a base packet header of the IPv4 data packet.

Figure 5:
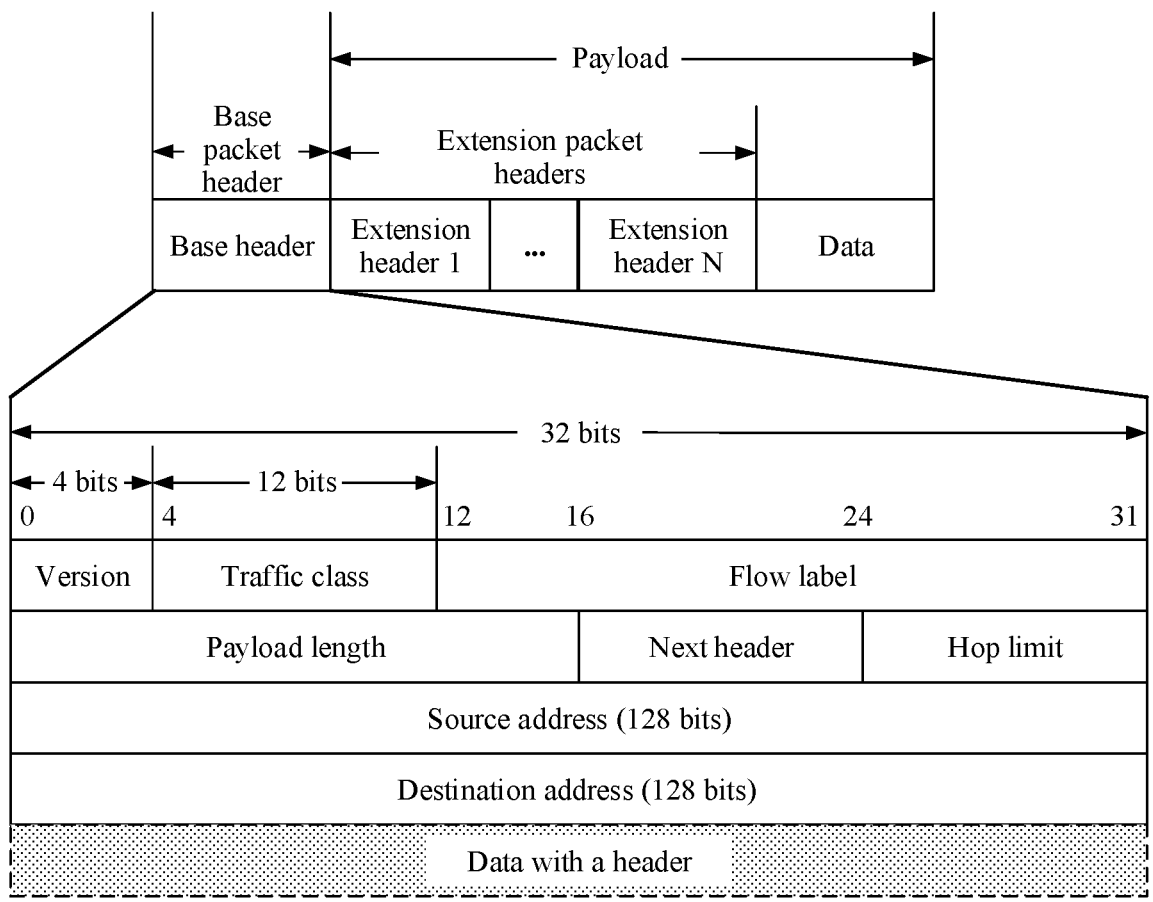
FIG. 5 is an example diagram 1 of a structure of an IPv6 data packet according to this application.

For example, FIG. 5 is an example diagram of a structure of the IPv6 data packet according to this application. As shown in FIG. 5, the IPv6 data packet includes a base header, N extension headers, and a data part. The base header may be referred to as a base packet header, and the N extension headers may be referred to as extension packet headers. The N extension headers and the data part may be referred to as payloads. The base header includes a version, a traffic class, a flow label, a payload length, a next header, a hop limit, a source address, and a destination address. In the IPv6 data packet, a unique communication flow of the IPv6 data packet may be determined by using the flow label, the source address, and the destination address, to transmit the IPv6 data packet. For specific explanations of fields in the IPv6 data packet, refer to descriptions in the conventional technology. Details are not described.

For example, as shown in FIG. 5, the terminal information may be carried in a data options header immediately following the destination address, and the data options header is located at a reserved position between the base header and the extension header of the IPv6 data packet. For example, a type-length-value (TLV) format may be used for encoding the data options header, where the type is information about a label and an encoding format, the length is used to define a length of a value, and the value represents an actual value of data. It should be noted that the data options header is not drawn in subsequent example diagrams of this application. However, when generating the data packet, the communications device may selectively set, based on a running status of the terminal and a user requirement, the terminal information in the data options header shown in FIG. 5.

In a second possible implementation, the terminal information may be carried in the extension packet header of the IPv6 data packet.

Figure 6:
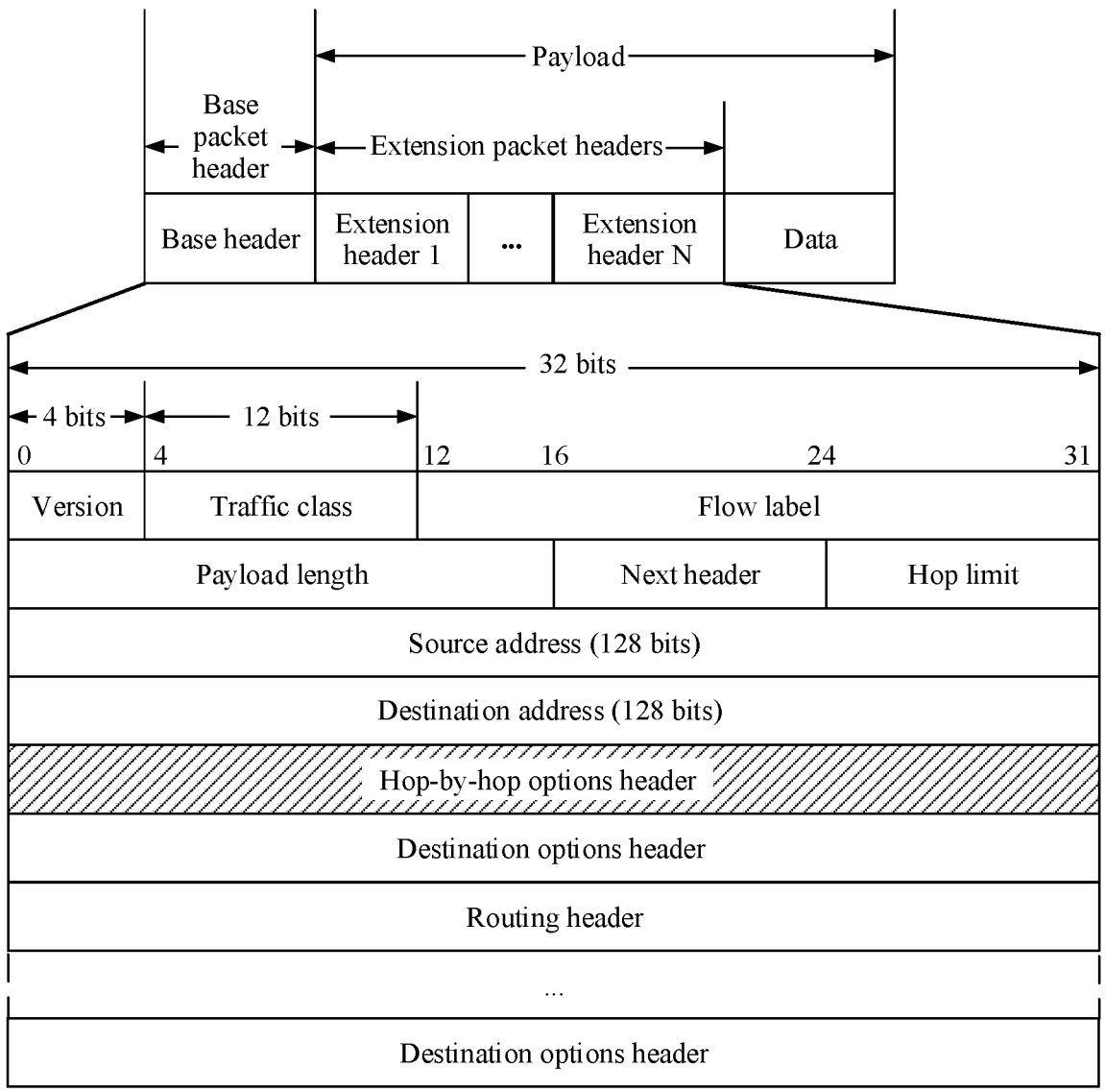
FIG. 6 is an example diagram 2 of a structure of an IPv6 data packet according to this application.

For example, as shown in FIG. 6, the terminal information in the data packet may be carried in a hop-by-hop options header of the extension packet header.

Figure 7:
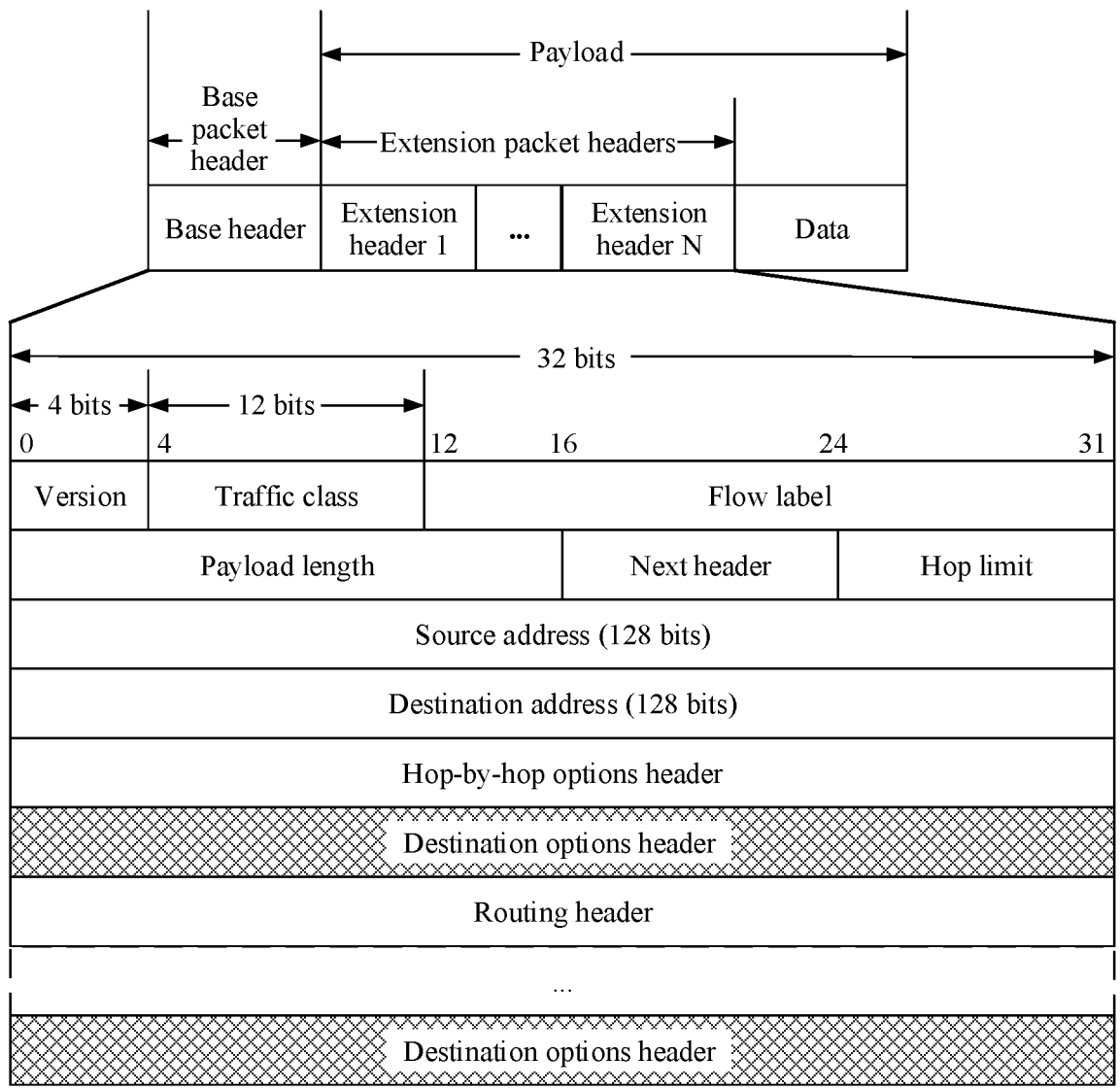
FIG. 7 is an example diagram 3 of a structure of an IPv6 data packet according to this application.

For another example, as shown in FIG. 7, the terminal information in the data packet may be carried in any destination options header of the extension packet header.

In some embodiments, as shown in FIG. 6 and FIG. 7, the terminal information in the data packet may be further carried in a routing header of the extension packet header, and the routing header may be set in a form of a segment routing header (SRH).

In a third possible design, the data packet may include at least two pieces of terminal information. The terminal information may be carried in at least one of the hop-by-hop options header and the destination options headers of the extension packet header.

Figure 8:
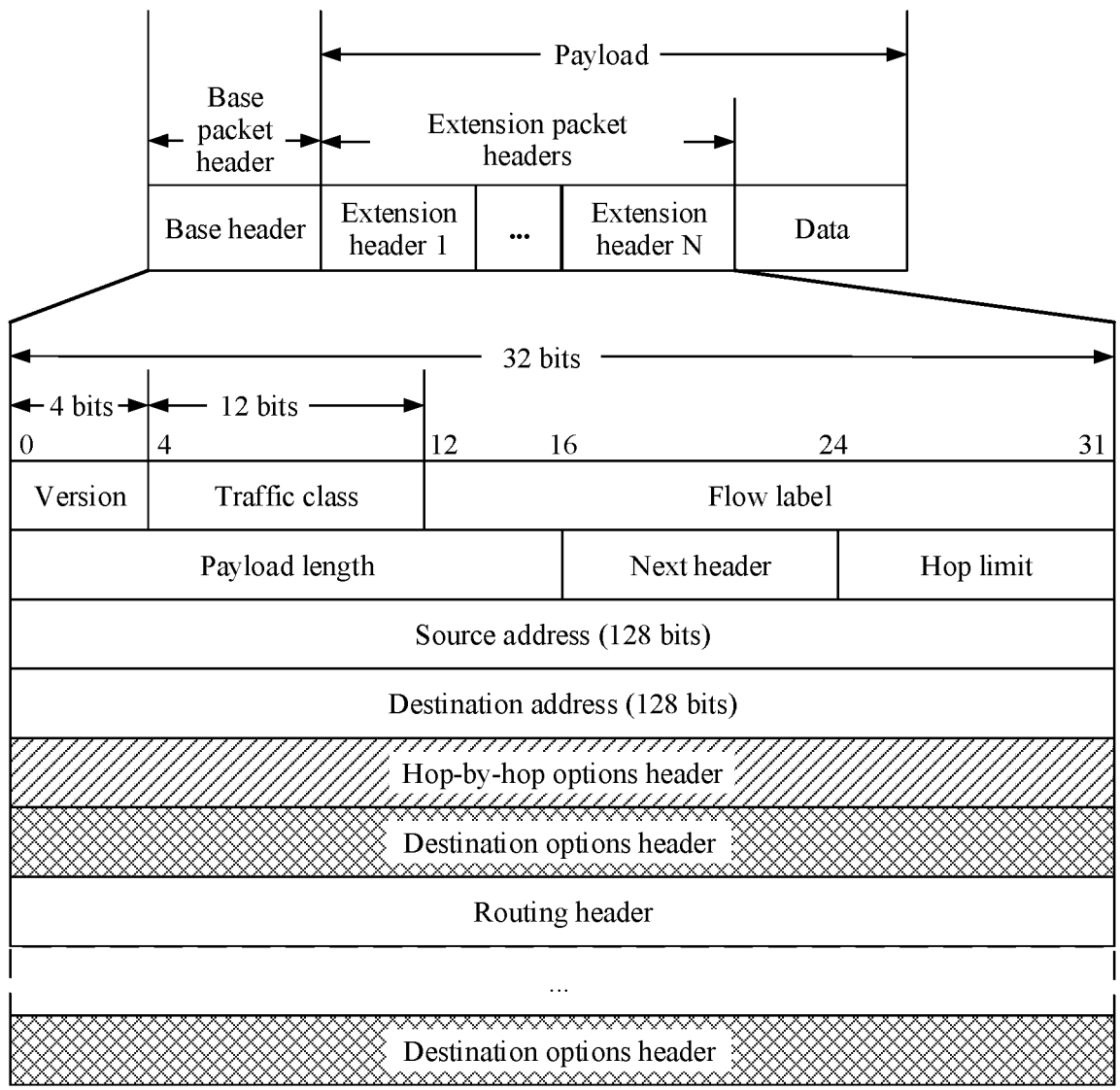
FIG. 8 is an example diagram 4 of a structure of an IPv6 data packet according to this application.

For example, as shown in FIG. 8, the terminal information may be carried in any one or a combination of a hop-by-hop options header and two destination options headers. For example, the MAC address is carried in the hop-by-hop options header of the extension packet header, and the IMEI is carried in a destination options header of the extension packet header. For another example, the MAC address is carried in a first destination options header of the extension packet header, and the IMEI is carried in a second destination options header of the extension packet header. For another example, the value of the terminal type is carried in the hop-by-hop options header of the extension packet header, the MAC address is carried in a first destination options header of the extension packet header, and the IMEI is carried in a second destination options header of the extension packet header.

In an optional implementation, the data packet may include at least two pieces of terminal information. One of the at least two pieces of terminal information may be carried in the base packet header, and the other of the at least two pieces of terminal information may be carried in the extension packet header.

The foregoing example is merely a possible implementation provided in this application. When generating a data packet, different communications devices may selectively set, based on the running status of the terminal and the user requirement, the terminal information in at least one of the base packet header, the hop-by-hop options header of the extension packet header, and the destination options header of the data packet.

S320: The communications device sends the data packet.

For example, if there is a forwarding device between the communications device and the network device, the data packet sent by the communications device may be forwarded by at least one forwarding device to reach the network device. A quantity of valid forwarding times of the data packet may be set by the communications device in a hop limit field of the base packet header.

S330: The network device receives a data packet.

In a first possible scenario, the data packet received by the network device may be the data packet from the communications device. For example, the network device may be an ONT (such as the network device 121 shown in FIG. 1(a) to FIG. 1(c)). The ONT is connected to the communications device (such as the terminal 115 shown in FIG. 1(a) to FIG. 1(c)) at Layer 2, and the ONT receives the data packet sent by the terminal 115. For another example, the network device may be a CR (such as the network device 124 shown in FIG. 2), and the communications device may be a BRAS (such as the network device 123 shown in FIG. 1(a) to FIG. 1(c)). The CR receives the data packet sent by the BRAS.

In a second possible scenario, the data packet received by the network device may alternatively be the data packet forwarded by the at least one other network device. For example, the network device may be a BRAS (such as the network device 123 shown in FIG. 1(a) to FIG. 1(c)). There are two network devices (such as the network device 121 and network device 122 shown in FIG. 1(a) to FIG. 1(c)) between the BRAS and the communications device (such as the terminal 115 shown in FIG. 1(a) to FIG. 1(c)). The data packet received by the BRAS is forwarded by the network device 122. On a transmission path of the data packet, the network device 121 and the network device 122 may add other information to the data packet sent by the terminal, for example, information about time at which the network device 121 receives the data packet.

S340: The network device determines, based on the terminal information in the data packet, the terminal type of the terminal corresponding to the terminal information.

The terminal information may be carried in the base packet header of the IPv6 data packet or the base packet header of the IPv4 data packet. Alternatively, the terminal information may be carried in the extension packet header of the IPv6 data packet. For an exemplary implementation, refer to the descriptions in S310.

If the terminal information is set in the hop-by-hop options header of the extension packet header, all network devices with processing capabilities on a forwarding path of the data packet may determine the terminal type of the terminal based on the terminal information. Alternatively, if the terminal information is set in the destination options header of the extension packet header, a destination network device (for example, an application server) determines the terminal type of the terminal based on the terminal information.

For example, in the foregoing second possible scenario, the terminal 115 sets a MAC address of the terminal 115 in the hop-by-hop options header of the extension packet header, and sets an IMEI of the terminal 115 in the destination options header of the extension packet header. In this case, the network device 121 to the network device 123 may obtain a manufacturer of the terminal 115 based on the MAC address of the terminal, and only the network device 123 serving as a destination network device can obtain a terminal model of the terminal 115 based on the IMEI of the terminal.

Figure 9:
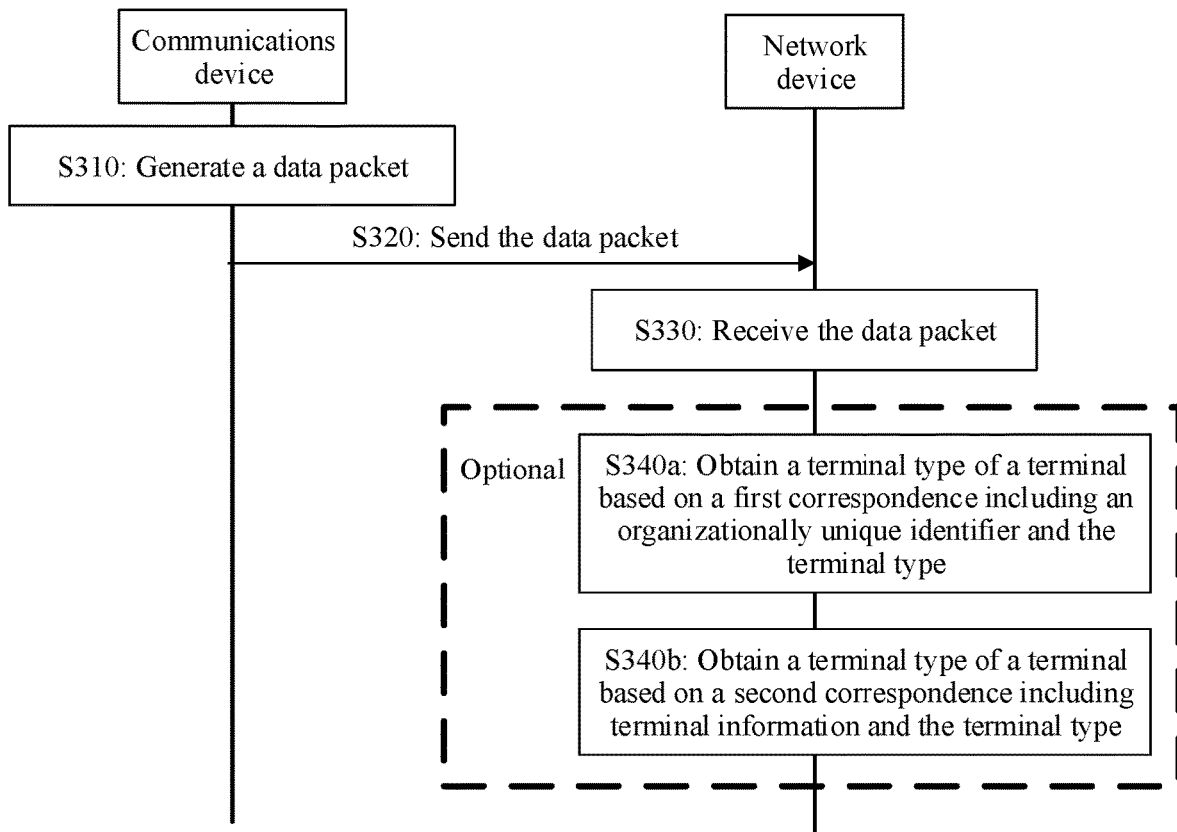
FIG. 9 is a schematic flowchart of another terminal identification method according to this application.

In some embodiments, if the terminal information is a MAC address, the network device may determine the terminal type based on an OUI included in the MAC address, as described in S340a in FIG. 9.

S340a: The network device obtains the terminal type of the terminal based on a first correspondence including the organizationally unique identifier and the terminal type.

The first correspondence may be stored in a form of an entry, a database, or the like, and may be stored locally on the network device or in a memory connected to the network device. For example, the first correspondence may be an OUI standard database allocated by the IEEE. The OUI standard database includes a correspondence between the OUI and the manufacturer of the terminal. The network device may query the OUI standard database based on the OUI (such as information corresponding to the bits 0 to 23 shown in FIG. 4) in the data packet, to obtain the manufacturer of the terminal.

In some other embodiments, if the terminal information is an IMEI, the network device may determine the terminal type based on the IMEI, as described in S340b in FIG. 9.

S340b: The network device obtains the terminal type of the terminal based on a second correspondence including the terminal information and the terminal type.

In some embodiments, the second correspondence may be a correspondence (for example, a query database provided by an IMEI website) between the IMEI and the terminal type.

For example, the network device shown in FIG. 9 is a BRAS (such as the network device 123 shown in FIG. 1(a) to FIG. 1(c)). After receiving the data packet from the terminal, the BRAS determines that a type of the terminal information (Terminal ID) is IMEI. The BRAS extracts the terminal information, for example, 868464039925887. The BRAS matches the terminal information with the second correspondence (for example, the database provided by the IMEI website), to obtain a terminal model "M 10 (ALP-AL00)" corresponding to the IMEI "868464039925887", as shown in Table 1.

TABLE 1

| Terminal model | M 10 (ALP-AL00) |
|---|---|
| Manufacturer/Brand vendor | HW |
| IMEI | TAC: 868464 FAC: 03 SNR: 992588 CD: 7 |

In some other embodiments, the second correspondence may alternatively be a correspondence between the terminal type and values of some fields of the IMEI, for example, terminal model databases established by different manufacturers for terminal models that are produced by the manufacturers (for example, a manufacturer "HW" has established a terminal model database for "M" series terminals and "B" series terminals that are manufactured by the manufacturer "HW"). For example, after determining the manufacturer of the terminal, the network device may query a terminal model database established by the manufacturer, to accurately identify the terminal model of the terminal.

For example, the second correspondence is the terminal model database provided by the manufacturer. The terminal model database includes a correspondence between the terminal type and some values in the terminal information. If the BRAS determines that the manufacturer of the terminal is "HW", the BRAS queries, in an IMEI terminal model database established by the manufacturer HW, a terminal model whose first eight digits are 86803100 in the IMEI based on the first eight digits: 86803100 in the IMEI of the terminal, to obtain information shown in Table 2:

TABLE 2

| ID | IMEI TAC | Terminal model |
|---|---|---|
| 87396 | 86803100 | HW B593 |

The first eight digits in the IMEI match the terminal type HW B593 in the IMEI terminal model database established by the manufacturer "HW".

In this way, compared with the conventional technology in which an ONT is connected to a terminal at Layer 2 and a manufacturer of a terminal is identified by using a MAC address, in the technical solution provided in the embodiments of this application, the network device may perform matching in the second correspondence (for example, the database provided by the IMEI website or the terminal model database provided by the manufacturer) based on some or all values in the IMEI, to obtain the terminal model of the terminal. This improves accuracy of identifying the terminal by the network device.

Compared with the conventional technology in which terminal information is covered in a process of transmitting a data packet by a network device, and the network device cannot obtain the terminal information, in the technical solution provided in the embodiments of this application, there is the terminal information in at least one location of the base packet header and the extension packet header of the data packet. This prevents the terminal information from being overwritten by other information from the network device that forwards the data packet, so that the network device that receives the data packet can obtain the terminal information. Regardless of a Layer 2 connection or a Layer 3 connection between the network device and the terminal, the network device may obtain the terminal type of the terminal based on the terminal information in the data packet. In addition to obtaining of terminal types used by users, the ISP can recommend different packages for different terminal types, to provide differentiated internet access services, information services, and value-added services for the users, and this improves user experience.

Figure 10:
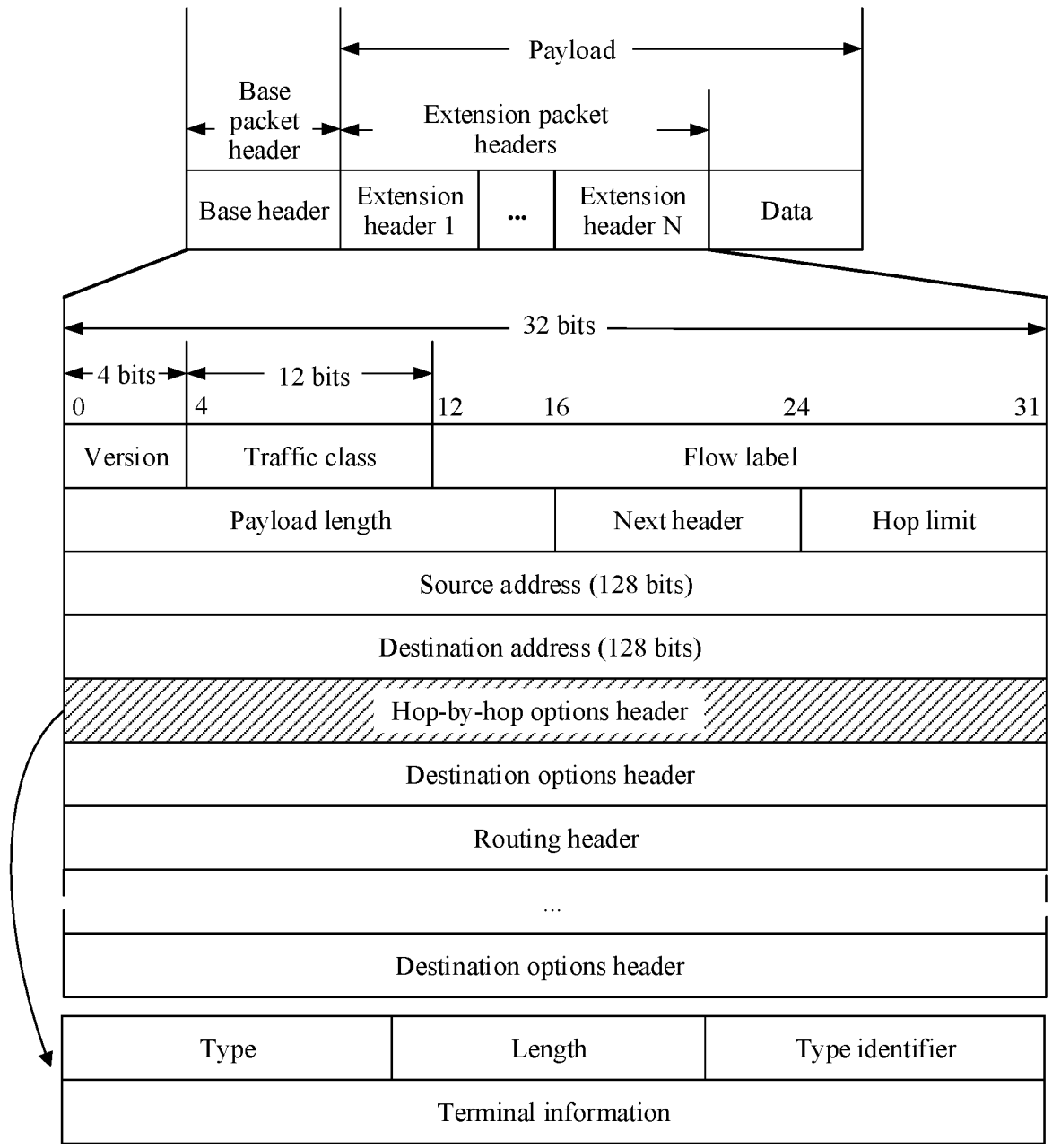
FIG. 10 is an example diagram 5 of a structure of an IPv6 data packet according to this application.

In a possible implementation, the data packet generated by the terminal may further include a type identifier. The type identifier may indicate the type of the terminal information, and the type identifier and the terminal information may be located in a same packet header, as shown in FIG. 10. Both the type identifier (Terminal ID Type) and the terminal information are carried in the hop-by-hop options header of the extension packet header, and the hop-by-hop options header includes a type (Type), a length (Length), the type identifier (Terminal ID Type), and the terminal information (Terminal ID).

The type (Type) is used to indicate information about a label and an encoding format corresponding to the extension packet header. The length (Length) is used to define a length of a value. The type identifier (Terminal ID Type) is used to indicate the type of the terminal information. For example, that the type identifier is "1" indicates a MAC address, and that the type identifier is "2" indicates an IMEI. The terminal information is a value (character string) of the terminal ID. For example, a terminal ID of a MAC type is 00FF663E1FA7 and a terminal ID of an IMEI type is 868464939925787.

To improve efficiency of terminal identification by the network device, before obtaining the terminal type of the terminal based on the terminal information, the network device may further determine the type of the terminal information based on the type identifier, and then perform matching in different correspondences based on the type of the terminal information, to obtain the terminal type of the terminal.

For example, the network device shown in FIG. 9 is a BRAS (such as the network device 123 shown in FIG. 1(a) to FIG. 1(c)). After receiving the data packet from the terminal, the BRAS determines, based on the type identifier (Terminal ID Type) in the data packet, that the type of the terminal information (Terminal ID) is MAC address. The BRAS extracts the terminal information, for example, 74D21D223761. The BRAS performs matching in the first correspondence (for example, the standard database of the OUI) based on the OUI in the terminal information, to obtain a manufacturer "HW" corresponding to the MAC address "74D21D223761", as shown in Table 3.

TABLE 3

| OUI | Manufacturer/Brand vendor |
|---|---|
| 74-D2-1D (hex) | HW TECHNOLOGIES CO., LTD |
| 74D21D (base 16) | HW TECHNOLOGIES CO., LTD |

In this way, when there is a routing forwarding device between the terminal and the network device, the network device may obtain the terminal information by using the data packet of the communications device, and perform matching in the first correspondence based on the OUI in the terminal information, to obtain the terminal type of the terminal corresponding to the terminal information.

Figure 11:
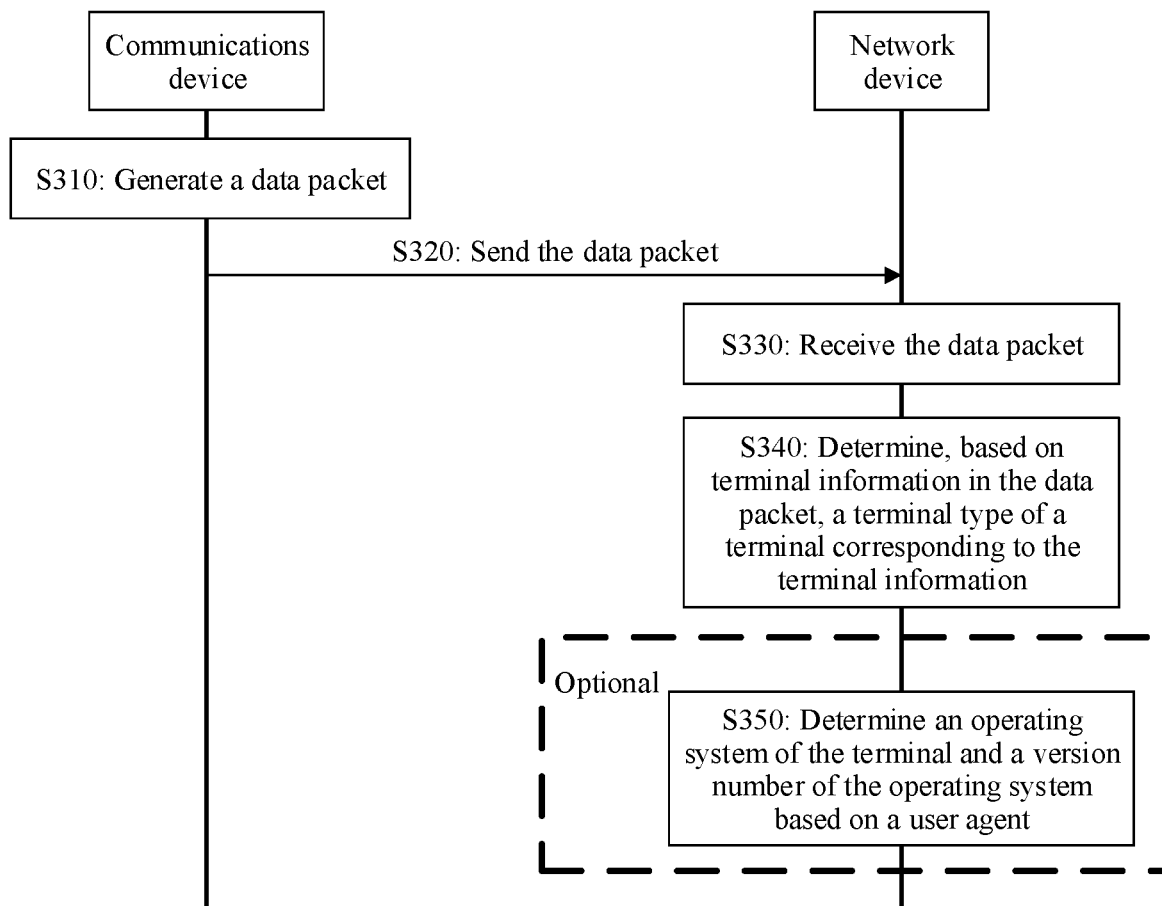
FIG. 11 is a schematic flowchart of another terminal identification method according to this application.

In a possible implementation, the data packet may further include a user agent (User Agent). The User Agent may be information generated when the terminal accesses the application server. On the basis of FIG. 3, to improve accuracy of the terminal identification, a possible implementation is provided. FIG. 11 is a schematic flowchart of another terminal identification method according to this application. After S340, the terminal identification method may further include the following steps.

S350: The network device determines an operating system of the terminal and a version number of the operating system based on the user agent.

In a possible embodiment, if the communications device is a terminal, the network device may further obtain, based on the user agent, a browser identifier and a browser version number that are used when the terminal accesses the application server. For example, the network device may capture, by using a "packet capture" method, the user agent in the data packet.

The network device may determine information such as the operating system of the terminal and the version number of the operating system based on the user agent, and use the information as an auxiliary means by which the network device determines the terminal type based on the terminal information, so that accuracy of terminal identification can be improved. The operating system may include, but is not limited to, Android, Windows, IOS, Linux, and the like.

For example, the network device shown in FIG. 11 is a BRAS, and the communications device is a terminal. The BRAS receives a data packet for accessing a network by a user, and parses a user agent in an HTTP request. As shown in Table 4, the first user agent is a data packet for accessing QY by the terminal. It is parsed, based on "User Agent: QY-Player-Android/2.0.94\r\n", that the operating system of the terminal is Android, a version number of a player is 2.0.94, and the terminal is an Android mobile phone. The BRAS determines that the manufacturer of the terminal is HW based on the MAC address: 74D21D223761 in the data packet. The BRAS finally determines that the terminal type of the terminal is an HW Android mobile phone. For example, when the BRAS subsequently receives the data packet (the terminal information is the MAC address: 74D21D223761), the BRAS may count an application analysis result in the "HW Android mobile phone".

TABLE 4

| Serial number | User agent (User Agent) |
| --- | --- |
| 1 | QY-Player-Android/2.0.94\r\n |
| 2 | Mozilla/5.0 (Linux; Android 4.4.2; X1 7.0 Build/HW Media Pad) |

For another example, for the second user agent shown in Table 4, the BRAS parses, based on "User Agent: Mozilla/5.0: (Linux; Android 4.4.2; X1 7.0 Build/HW Media Pad)", that the operating system of the terminal is Android, the version number of the Android system is 4.4.2, and the terminal is an HW portable Android device (PAD). The BRAS determines, based on the MAC address: 74D21D466585 in the data packet, that the manufacturer of the terminal is HW again. The BRAS finally determines that the terminal type is an HW Android PAD. For example, when the BRAS receives the data packet (the terminal information is the MAC address: 74D21D466585), the BRAS counts the application analysis result in the "HW Android PAD".

The network device may determine the operating system of the terminal and the version number of the operating system based on the user agent in the data packet. The operating system and the version number of the operating system may assist in further determining the terminal type of the terminal based on the terminal information, and this improves accuracy of identifying the terminal type of the terminal by the network device.

Figure 12:
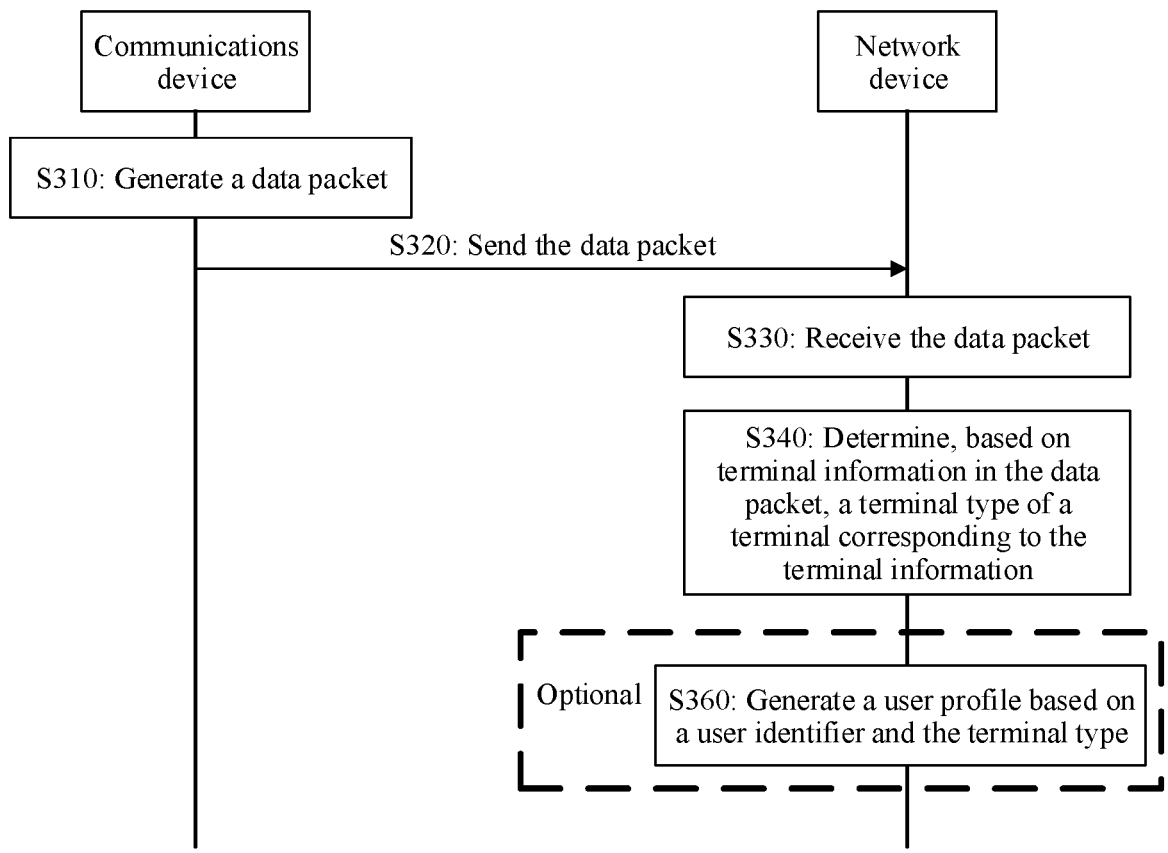
FIG. 12 is a schematic flowchart of another terminal identification method according to this application.

In a possible implementation, the data packet may further include a user identifier. When the ISP obtains the terminal type of the terminal through the network device, the network device may further perform user profiling based on the terminal type and the user identifier in the data packet, to provide a differentiated service for the user based on a user profile. FIG. 12 is a schematic flowchart of another terminal identification method according to this application. After S340, the terminal identification method may further include the following steps.

S360: The network device generates a user profile based on the user identifier and the terminal type.

The user profile represents a correspondence between the user identifier and the terminal type.

The network device may obtain main audiences and target groups of differentiated services based on user profiles. For example, the differentiated service may be package promotion, wireless local area network (WLAN) differentiated scheduling, admission authentication of a terminal, and a quality of service (QoS) management policy.

Figures 13A, 13B, 13C:
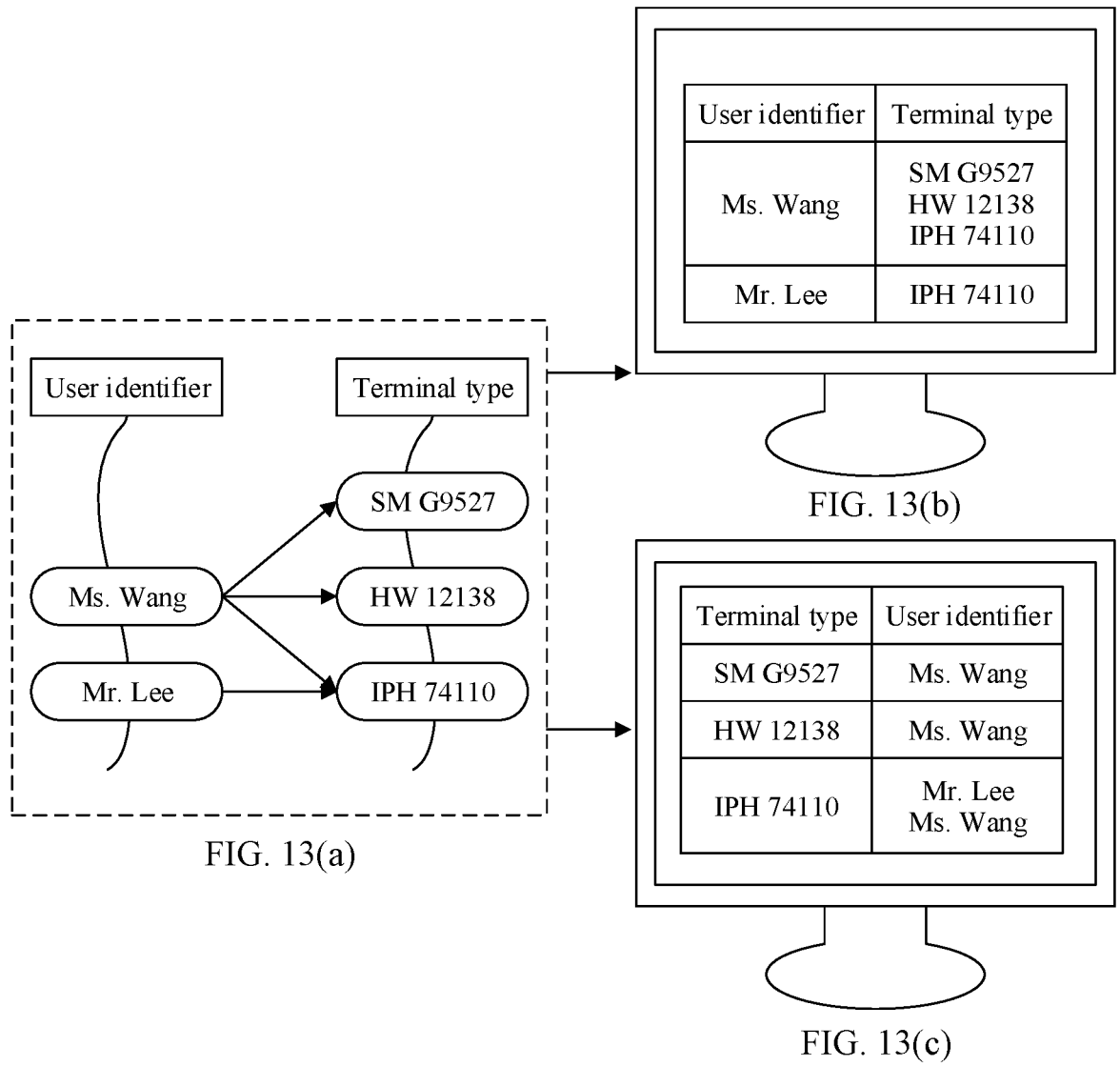
FIG. 13(a) to FIG. 13(c) are schematic diagrams of a user profile according to this application.

For the foregoing user profile, in a possible implementation, FIG. 13(a) to FIG. 13(c) are schematic diagrams of a user profile according to this application. FIG. 13(a) illustrates a correspondence between two user identifiers and three terminal types. The two user identifiers are: Ms. Wang and Mr. Li. The three terminal types are SM G9527, HW 12138, and IPH 74110.

For another example, FIG. 13(b) illustrates an example of displaying, by using the user identifiers as marking start points, terminal types used by the users corresponding to the user identifiers. For example, Ms. Wang has used three terminal types: SM G9527, HW 12138, and IPH 74110, and Mr. Li has used IPH 74110.

For another example, FIG. 13(c) illustrates an example of displaying, by using the terminal types as marking start points, users using the terminal types. For example, only Ms. Wang uses terminal types "SM G9527" and "HW 12138", and both "Ms. Wang" and "Mr. Li" use "IPH 74110".

It should be noted that the correspondence between the user identifier and the terminal type and the example shown in FIG. 13(a) to FIG. 13(c) are only possible implementations provided in the embodiments of this application. In another possible case, the network device may further send the user profile to an application server of a service provider, and the service provider may view the user profile through the application server, to provide the differentiated service for the user. For example, the ISP may group the generated user profiles based on a natural region or an administrative region in which the terminal is located, to provide user profiles of different regions for the service provider, and the service provider may provide differentiated value-added services for the users based on the user profiles.

In some embodiments, after the network device obtains the terminal type of the terminal, the network device may not only perform the user profiling based on the user identifier and the terminal type, but also display the user identifier and the terminal type, so that an administrator of the ISP may query information such as the terminal type.

For example, the network device may display, through a display module, information such as the terminal type of the terminal, the operating system, and the version number of the operating system. The display module may be a display area on the network device, or may be a display externally connected to the network device. In a possible implementation, the display module may further display information such as the user profile and the user identifier carried in the data packet. The display module may be implemented through a display panel. The display panel may be a liquid crystal display (LCD), an organic light emitting diode (OLED), an active-matrix organic light emitting diode, or an active-matrix organic light emitting diode (AMOLED), a flexible light emitting diode (FLED), a mini-LED, a micro-LED, a micro-OLED, a quantum dot light emitting diode (QLED), and the like. In some possible embodiments, the network device may include one or N display panels, and N is a positive integer greater than 1.

Figure 14A:
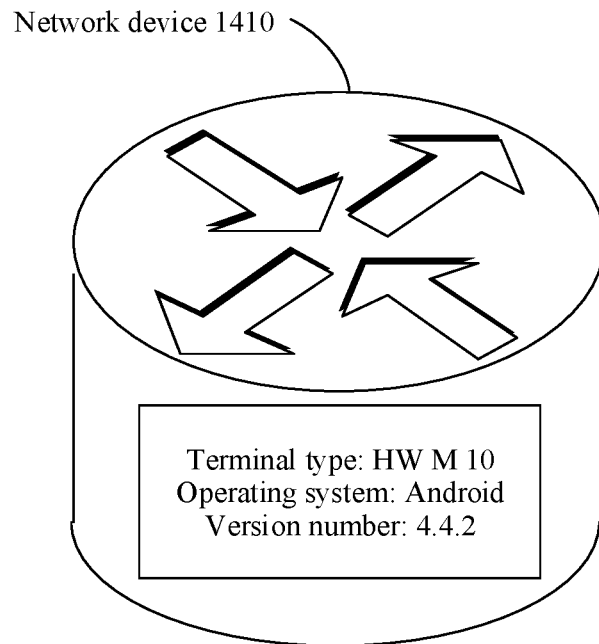
FIG. 14(a) and FIG. 14(b) are schematic diagrams for displaying a terminal type according to this application.
Figure 14B:
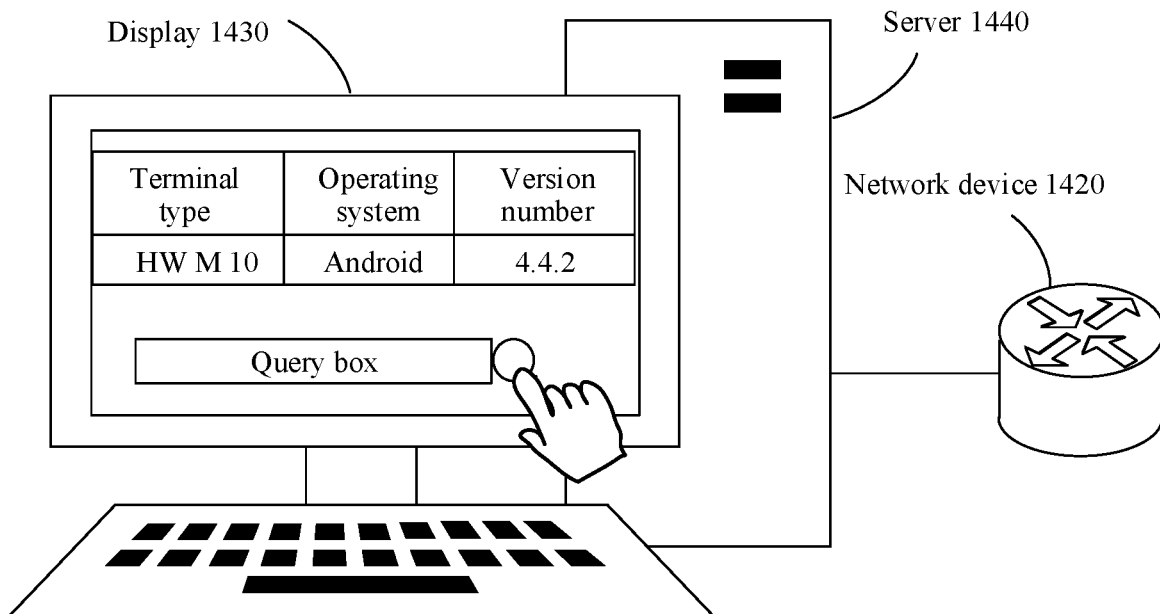

For another example, as shown in FIG. 14(a) and FIG. 14(b), FIG. 14(a) is a display area of the display module on a network device 1410. The display area displays information such as a user identifier, a terminal type of a terminal, an operating system, and a version number of the operating system of the terminal. For example, the display area may be a detachable screen, or may be a projection device disposed on the network device. The projection device may display information such as the user identifier and the terminal type of the terminal, the operating system, and the version number of the operating system by projection onto a medium such as a curtain or a wall.

For another example, as shown in FIG. 14(a) and FIG. 14(b), FIG. 14(b) is a display 1430 in which the display module is communicatively connected to a network device 1420. The display 1430 may display the information such as the user identifier, the terminal type of the terminal, the operating system, and the version number of the operating system. It should be noted that a connection between the network device and the display may be a wired connection, or may be a wireless connection. For example, the wired connection may be that the network device and the display are connected through at least one of a high definition multimedia interface (HDMI), a video graphics array (VGA) interface, and a universal serial bus (USB) interface. The USB interface is an interface that complies with a USB standard specification, and may be a mini USB interface, a micro USB interface, a USB Type C interface, or the like. The wireless connection may be that the network device and the display are connected by using a wireless communications protocol such as Bluetooth or Wi-Fi, to implement signaling transmission between the network device and the display.

In some possible cases, as shown in FIG. 14(b), the display 1430 may alternatively be connected to the network device 1420 through a server 1440. An administrator of the ISP may filter or query the information such as the terminal type on the display 1430 through an input device connected to the server 1440. For example, a "query box" in the display 1430 is selected in input mode such as touch or a mouse, and a query condition is entered in the "query box" in input mode such as touch or a keyboard, to obtain a query result.

Figure 15A:
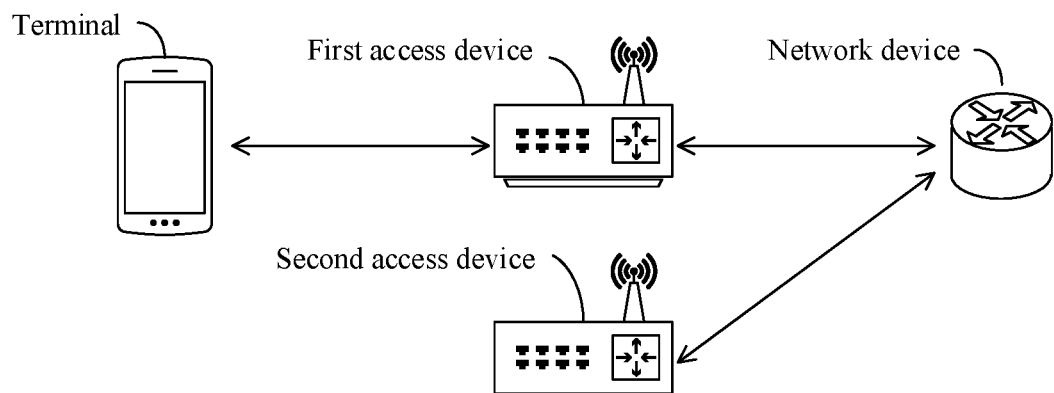
FIG. 15(a) and FIG. 15(b) are schematic diagrams of an architecture of another communications network according to this application.
Figure 15B:
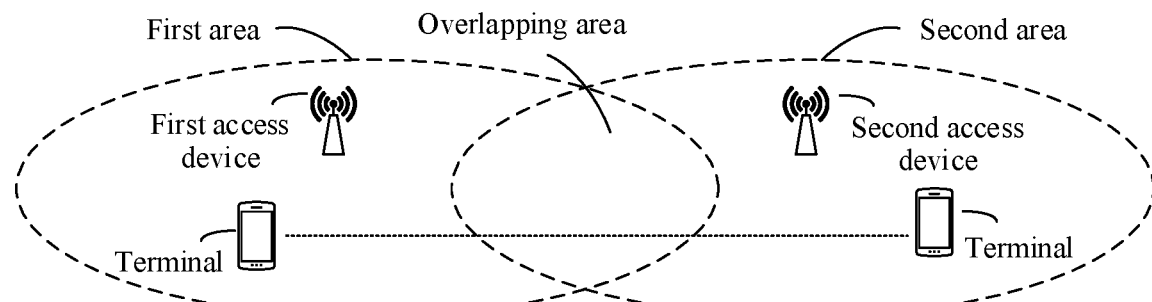

In a possible implementation, FIG. 15(a) and FIG. 15(b) are schematic diagrams of an architecture of another communications network according to this application. As shown in FIG. 15(a), a terminal is connected to a network device through a first access device, and the network device is further connected to a second access device.

In some embodiments, the network device may be further connected to more access devices. An example in which the network device is connected to two access devices is used for description in this application. However, the network device provided in this application may be further connected to more access devices.

For example, the network device shown in FIG. 15(a) may be an AC. For example, the network device is the network device 133 shown in FIG. 1(a) to FIG. 1(c). The first access device and the second access device may be APs. For example, the first access device is the network device 129 shown in FIG. 1(a) to FIG. 1(c), and the second access device is the network device 130 shown in FIG. 1(a) to FIG. 1(c).

In some embodiments, the first access device and the second access device may have wireless coverage areas that are partially overlapped. As shown in FIG. 15(b), if the terminal is connected to the network device through the first access device, and further connected to the Ethernet, in a process in which the terminal moves from a coverage area (a first area) of the first access device to a coverage area (a second area) of the second access device, a connection signal between the terminal and the first access device gradually deteriorates. As a result, network freezing occurs when the terminal uses the Ethernet.

For the network freezing of the terminal, a currently used technical solution is as follows: If the network freezing occurs when the terminal is connected to the first access device, the user performs an operation on the terminal, so that the terminal accesses the Ethernet through another access device (the terminal is in a coverage area of the access device currently). However, when the terminal selects the access device, the user needs to perform a manual operation. For example, the user plays an online mobile game by using the terminal when taking a bus, if a connection signal between the terminal and an access device to which the terminal is connected deteriorates, the mobile game is disconnected. To maintain a smooth network of the mobile phone, the user manually hands over the terminal between access devices, which consumes a large amount of time and deteriorates gaming experience.

Figure 16:
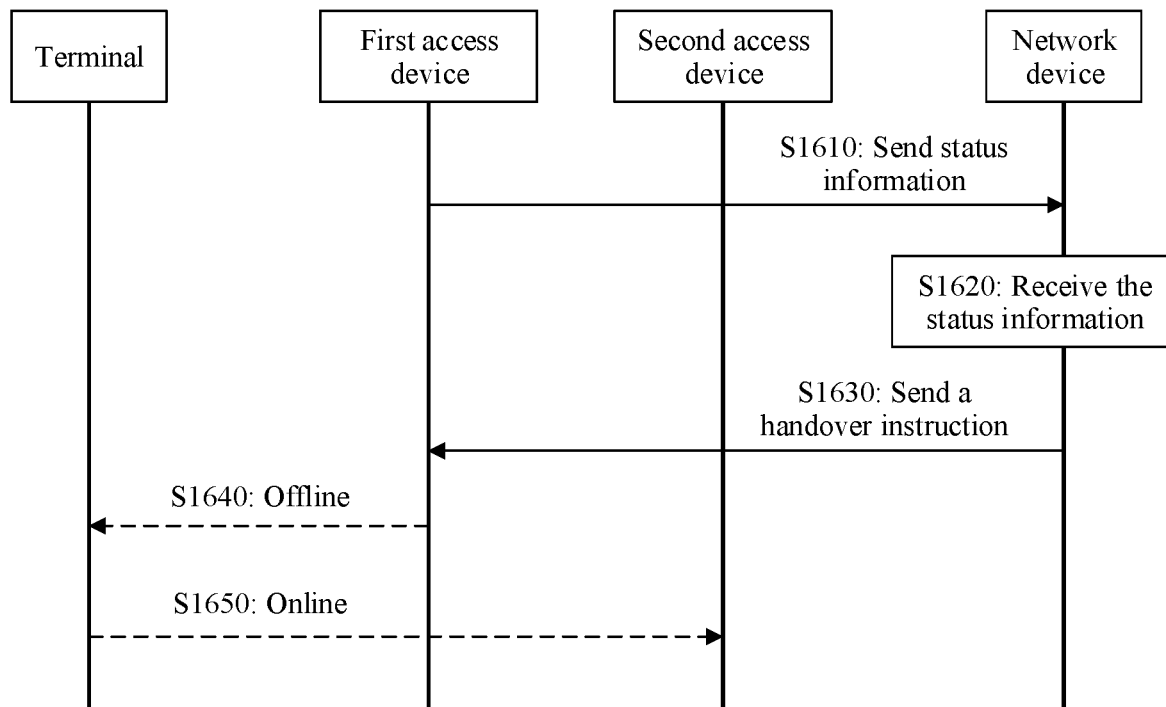
FIG. 16 is a schematic flowchart of another terminal identification method according to this application.

To resolve the deficiency of the foregoing technical solution, this application further provides a technical solution of WLAN differentiated scheduling. FIG. 16 is a schematic flowchart of another terminal identification method according to this application. The terminal identification method may further include the following steps.

S1610: The first access device sends status information to the network device.

The status information may include, but is not limited to, a signal-to-noise ratio of a connection signal between the terminal and the first access device, current location information of the terminal, a protocol supported by the terminal, and the like.

In a possible implementation, the first access device may periodically report the status information of the terminal to the network device. For example, the first access device reports the status information to the network device once every minute.

In another possible implementation, the first access device may report the status information of the terminal to the network device when a location of the terminal meets a preset condition. For example, when the terminal is in an overlapping area of the second area and the first area, the first access device reports the status information of the terminal to the network device.

S1620: The network device receives the status information.

In an optional implementation, the network device may further determine whether a terminal type of the terminal matches a preset terminal type. If the network device determines that the terminal type matches the preset terminal type, the terminal belongs to a target group for which the ISP provides a differentiated service, and the network device may further perform S1630. For example, the preset terminal type may be that the terminal is manufactured by a manufacturer, for example, "IPH". The preset terminal type may alternatively be that a sales price of the terminal is greater than or equal to a price threshold (for example, 5000 yuan). The preset terminal type may alternatively be that a terminal model of the terminal matches a preset terminal model, for example, "HW M 10".

In some embodiments, if the network device determines that the terminal type does not match the preset terminal type, the terminal corresponding to terminal information is not a target group for which the ISP provides the differentiated service, and the ISP does not need to provide the differentiated service for the terminal.

S1630: The network device sends a handover instruction to the first access device based on the terminal type and the signal-to-noise ratio.

The handover instruction is used to instruct the terminal to be handed over from the first access device to the second access device, and the terminal is in the coverage area (the second area) of the second access device currently.

For example, if the network device determines, based on the signal-to-noise ratio, that a connection signal of the terminal is poor, and the terminal needs to be handed over between the access devices, the network device sends the handover instruction to the first access device.

For another example, the first access device may be a network device that supports a base station subsystem (BSS) transition management framework (802.11v). After obtaining the terminal type of the terminal based on the terminal information, the network device may learn, by query, that the terminal type of the terminal also supports 802.11v. In this case, when the terminal type of the terminal matches the preset terminal type, the network device may send the handover instruction (the handover instruction supports 802.11v) to the first access device.

S1640: The terminal goes offline from the first access device.

In a possible implementation, a process in which the terminal goes offline from the first access device may be that after the first access device receives the handover instruction, the first access device actively disconnects from the terminal.

In another possible implementation, a process in which the terminal goes offline from the first access device may be that the terminal actively disconnects from the first access device after receiving the handover instruction forwarded by the first access device.

S1650: The terminal goes online and accesses the second access device.

In this way, in all coverage areas of the access device to which the network device is connected, the network device may determine, based on the status information of the terminal, whether to hand over the terminal from the access device to which the terminal is connected, and the network to which the terminal is connected is smooth without manual selection by the user.

It may be understood that, to implement the functions in the foregoing embodiments, the network device and the terminal include corresponding hardware structures and/or software modules for performing each function. A person of ordinary skill in the art should easily be aware that, in combination with the units and the method steps in the examples described in the embodiments disclosed in this application, this application can be implemented by hardware or a combination of hardware and computer software. Whether a function is performed by hardware or hardware driven by computer software depends on particular application scenarios and design constraints of the technical solutions.

Figure 17:
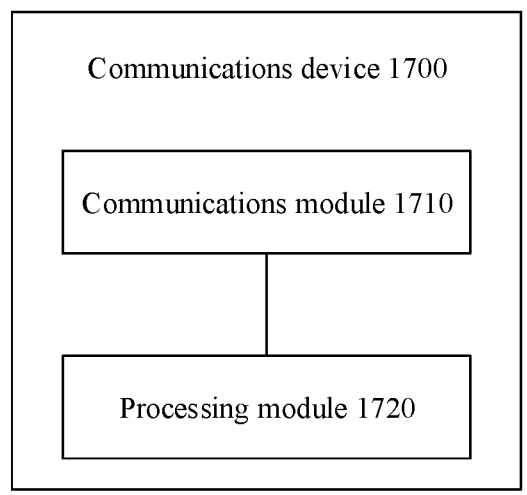
FIG. 17 is a schematic diagram of a structure of a communications apparatus according to this application.

FIG. 17 is a schematic diagram of a structure of a communications apparatus according to this application. The communications apparatus may be configured to implement functions of the terminal of the network device in the foregoing method embodiments. Therefore, beneficial effects of the foregoing method embodiments can also be implemented. In the embodiments of this application, the communications apparatus may be any one of the terminal 111 to the terminal 115 shown in FIG. 1(a) to FIG. 1(c), or may be any one of the network device 121 to the network device 134 shown in FIG. 1(a) to FIG. 1(c), or may be a module (for example, a chip) applied to the terminal or the network device.

As shown in FIG. 17, a communications apparatus 1700 includes a communications module 1710 and a processing module 1720. The communications apparatus 1700 is configured to implement a function of the terminal or the network device in the method embodiment shown in FIG. 2, FIG. 3, FIG. 9, FIG. 11, FIG. 12, or FIG. 16.

When the communications apparatus 1700 is configured to implement the function of the terminal in the method embodiment shown in FIG. 2, the communications module 1710 is configured to perform S201.

When the communications apparatus 1700 is configured to implement the function of the network device in the method embodiment shown in FIG. 2, the processing module 1720 is configured to perform S202 and S203, and the communications module 1710 is configured to perform S204 to S206.

When the communications apparatus 1700 is configured to implement the function of the communications device in the method embodiment shown in FIG. 3, the processing module 1720 is configured to perform S310, and the communications module 1710 is configured to perform S320.

When the communications apparatus 1700 is configured to implement the function of the network device in the method embodiment shown in FIG. 3, the communications module 1710 is configured to perform S330, and the processing module 1720 is configured to perform S340.

When the communications apparatus 1700 is configured to implement the function of the communications device in the method embodiment shown in FIG. 9, the processing module 1720 is configured to perform S310, and the communications module 1710 is configured to perform S320.

When the communications apparatus 1700 is configured to implement the function of the network device in the method embodiment shown in FIG. 9, the communications module 1710 is configured to perform S330, and the processing module 1720 is configured to perform S340a and S340b.

When the communications apparatus 1700 is configured to implement the function of the communications device in the method embodiment shown in FIG. 11, the processing module 1720 is configured to perform S310, and the communications module 1710 is configured to perform S320.

When the communications apparatus 1700 is configured to implement the function of the network device in the method embodiment shown in FIG. 11, the communications module 1710 is configured to perform S330, and the processing module 1720 is configured to perform S340 and S350.

When the communications apparatus 1700 is configured to implement the function of the communications device in the method embodiment shown in FIG. 12, the processing module 1720 is configured to perform S310, and the communications module 1710 is configured to perform S320.

When the communications apparatus 1700 is configured to implement the function of the network device in the method embodiment shown in FIG. 12, the communications module 1710 is configured to perform S330, and the processing module 1720 is configured to perform S340 and S360.

When the communications apparatus 1700 is configured to implement the function of the terminal in the method embodiment shown in FIG. 16, the communications module 1710 is configured to perform S1640 and S1650.

When the communications apparatus 1700 is configured to implement the function of the network device in the method embodiment shown in FIG. 16, the communications module 1710 is configured to perform S1620.

For more detailed descriptions of the processing module 1720 and the communications module 1710, refer to related descriptions in the method embodiment shown in FIG. 2, FIG. 3, FIG. 9, FIG. 11, FIG. 12, or FIG. 16. Details are not described herein again.

In some embodiments, the communications apparatus 1700 may further include a display module, and the display module is configured to display information such as a terminal type of the terminal, an operating system of the terminal, and a version number of the operating system. The display module may be further configured to display the user profile and the like in the foregoing embodiments.

In some other embodiments, the communications apparatus 1700 may further include a storage module, and the storage module is configured to store information such as instructions, the terminal type, the user profile, the operating system of the terminal, and the version number. The storage module may be further configured to store the first correspondence, the second correspondence, and the like in the foregoing embodiments.

The division into the units in this application is an example, and is merely logical function division. There is another optional division manner during actual implementation.

Figure 18:
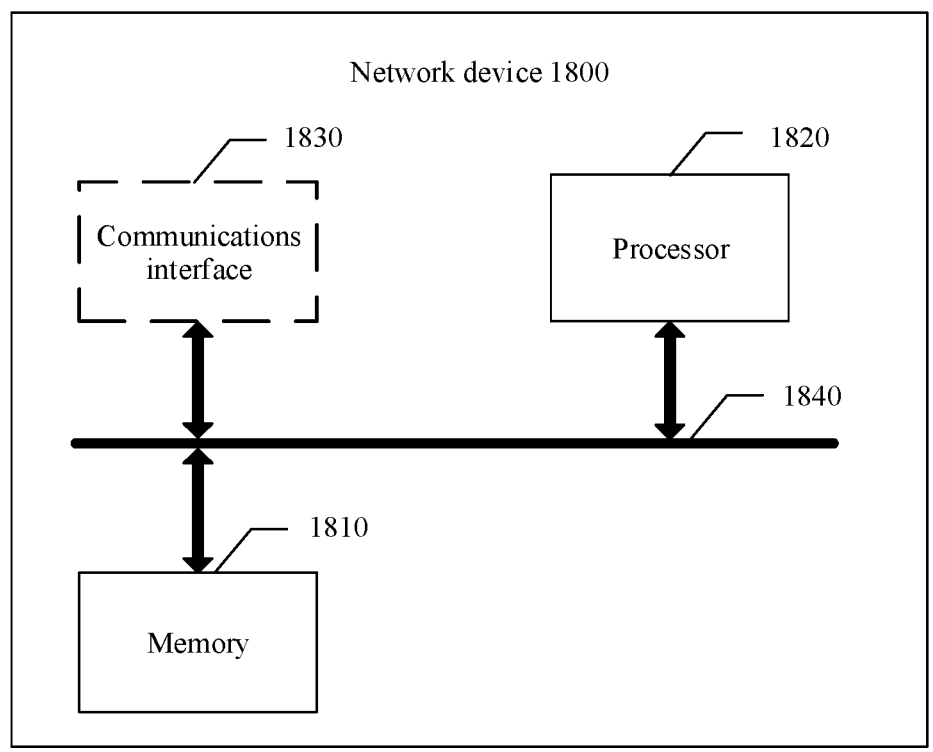
FIG. 18 is a schematic diagram of a structure of a network device according to this application.

This application further provides a network device. As shown in FIG. 18, a network device 1800 includes a processor 1810 and a communications interface 1820. The processor 1810 and the communications interface 1820 are coupled to each other. It may be understood that the communications interface 1820 may be a transceiver or an input/output interface. Optionally, the communications apparatus 1800 may further include a memory 1830, configured to store instructions executed by the processor 1810, or input data required by the processor 1810 to run the instructions, or data generated after the processor 1810 runs the instructions.

When the network device 1800 is configured to implement the method shown in FIG. 2, FIG. 3, FIG. 9, FIG. 11, FIG. 12, or FIG. 16, the processor 1810 is configured to perform a function of the processing module 1720, and the communications interface 1820 is configured to perform a function of the communications module 1710.

A specific connection medium between the communications interface 1830, the processor 1820, and the memory 1810 is not limited in the embodiments of this application. In the embodiments of this application, in FIG. 18, the communications interface 1830, the processor 1820, and the memory 1810 are connected through a bus 1840. The bus is represented by using a thick line in FIG. 18. A connection manner between other components is merely an example for description, and constitutes no limitation. The bus may be classified into an address bus, a data bus, a control bus, and the like. For ease of representation, only one thick line is used to represent the bus in FIG. 18, but this does not mean that there is only one bus or only one type of bus.

The memory 1810 may be configured to store a software program and a module, for example, program instructions/a module corresponding to the terminal identification method provided in the embodiments of this application. The processor 1820 executes the software program and the module stored in the memory 1810, to execute various functional applications and data processing. The communications interface 1830 may be configured to perform signaling or data communication with another node device. In this application, the communications device 1800 may have a plurality of communications interfaces 1830.

The memory may be, but is not limited to, a random access memory (RAM), a read-only memory (ROM), a programmable read-only memory (PROM), an erasable programmable read-only memory (EPROM), an electrically erasable programmable read-only memory (EEPROM), and the like.

The processor may be an integrated circuit chip and has a signal processing capability. The processor may be a general-purpose processor, including a central processing unit (CPU), a network processor (NP), and the like; or may be a digital signal processor (DSP), an application-specific integrated circuit (ASIC), a field-programmable gate array (FPGA), another programmable logic device, a discrete gate, a transistor logic device, a discrete hardware component, or the like.

Figure 19:
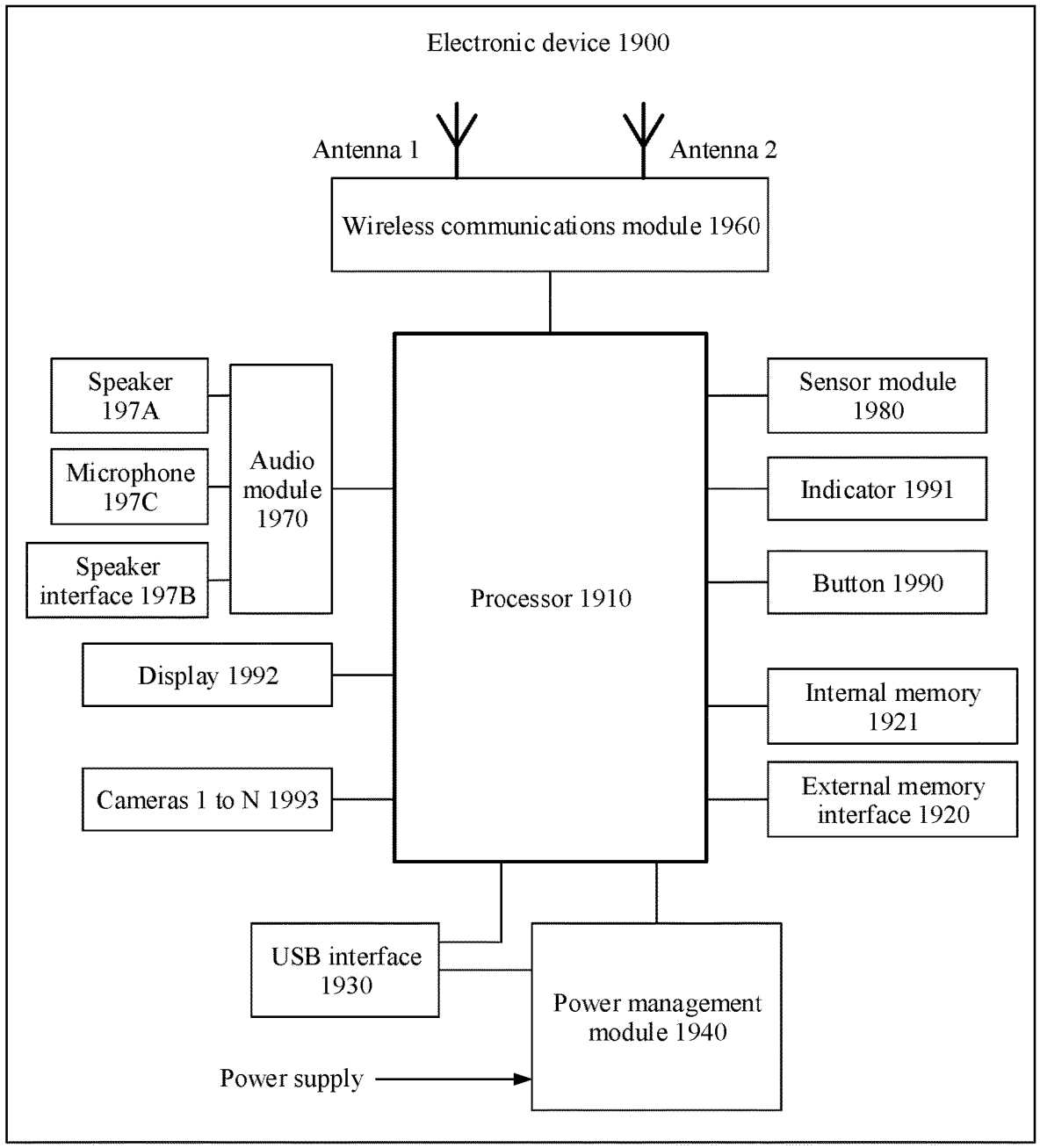
FIG. 19 is a schematic diagram of a structure of a communications device according to this application.

This application further provides a communications device. As shown in FIG. 19, a communications device 1900 may include a processor 1910, an external memory interface 1920, an internal memory 1921, a USB interface 1930, a charging management module 1940, a power management module 1941, a battery 1942, an antenna 1, an antenna 2, a mobile communications module 1950, a wireless communications module 1960, an audio module 1970, a speaker 197A, a receiver 197B, a microphone 197C, a headset jack 197D, a sensor module 1980, a button 1990, a motor 1991, an indicator 1992, a camera 1993, a display 1994, a subscriber identification module (SIM) card interface 1995, and the like. The sensor module 1980 may include a pressure sensor, a gyroscope sensor, a barometric pressure sensor, a magnetic sensor, an acceleration sensor, a range sensor, an optical proximity sensor, a fingerprint sensor, a temperature sensor, a touch sensor, an ambient light sensor, a bone conduction sensor, and the like.

It may be understood that an example structure in this embodiment does not constitute a specific limitation on the communications device 1900. In other embodiments of this application, the communications device 1900 may include more or fewer components than those shown in the figure, or some components may be combined, or some components may be split, or there may be a different component layout. The components shown in the figure may be implemented by hardware, software, or a combination of software and hardware.

The method steps in the embodiments of this application may be implemented in a hardware manner or may be implemented in a manner of executing a software instruction by a processor. The software instruction may be formed by a corresponding software module. The software module may be stored in a RAM, a flash memory, a ROM, a PROM, an EPROM, an EEPROM, a register, a hard disk, a removable hard disk, a CD-ROM, or a storage medium of any other form known in the art. For example, a storage medium is coupled to a processor, so that the processor can read information from the storage medium and can write information into the storage medium. Certainly, the storage medium may be a component of the processor. The processor and the storage medium may be located in an ASIC. In addition, the ASIC may be located in the network device or the terminal. Certainly, the processor and the storage medium may exist in the network device or the terminal as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer programs or instructions. When the computer programs or the instructions are loaded and executed on a computer, all or some of procedures or functions in the embodiments of this application are performed. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid state drive (SSD).

In the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. "And/or" describes an association relationship between associated objects, and indicates that three relationships may exist. For example, A and/or B may indicate the following cases: A exists alone, both A and B exist, and B exists alone, where A and B may be singular or plural. In the text descriptions of this application, the character "/" usually indicates an "or" relationship between the associated objects. In a formula in this application, the character "/" indicates a "division" relationship between the associated objects.

It may be understood that various numbers in the embodiments of this application are merely used for differentiation for ease of description, and are not used to limit the scope of the embodiments of this application. The execution sequences of the processes should be determined according to functions and internal logic of the processes.

What is claimed is:

1. A network device, comprising:
   at least one processor; and
   one or more memories coupled to the at least one processor and storing programming instructions, wherein the at least one processor is configured to execute the programming instructions to cause the network device to:
   receive a data packet, wherein an internet protocol (IP) packet header of the data packet comprises terminal information; and
   determine, based on the terminal information, a terminal type of a terminal corresponding to the terminal information, and
   wherein the IP packet header further comprises a type identifier, the type identifier indicates a type of the terminal information, and the type of the terminal information comprises a media access control (MAC) address and/or an international mobile equipment identity (IMEI).

2. The network device according to claim 1, wherein a base packet header or an extension packet header of the IP packet header comprises the terminal information.

3. The network device according to claim 2, wherein the extension packet header comprises a hop-by-hop options header and/or a destination options header.

4. The network device according to claim 1, wherein the terminal information comprises an organizationally unique identifier, and determining the terminal type of the terminal based on the terminal information comprises:
   obtaining the terminal type of the terminal based on a first correspondence comprising the organizationally unique identifier and the terminal type.

5. The network device according to claim 1, wherein determining the terminal type of the terminal based on the terminal information comprises:
   obtaining the terminal type of the terminal based on a second correspondence comprising the terminal information and the terminal type.

6. The network device according to claim 1, wherein the data packet further comprises a user identifier, and after determining the terminal type of the terminal based on the terminal information, the network device is further caused to:
   generate a user profile based on the user identifier and the terminal type, wherein the user profile represents a correspondence between the user identifier and the terminal type.

7. The network device according to claim 1, wherein the data packet further comprises a user agent, and after determining the terminal type of the terminal based on the terminal information, the network device is further caused to:
   determine an operating system of the terminal and a version number of the operating system based on the user agent.

8. The network device according to claim 7, wherein the network device is further caused to:
   display the terminal type, the operating system of the terminal, and the version number of the operating system.

9. The network device according to claim 1, wherein the network device is further caused to:
   receive status information sent by a first access device, wherein the status information comprises a signal-tonoise ratio of a connection signal between the terminal and the first access device; and send a handover instruction to the first access device based on the terminal type and the signal-to-noise ratio, wherein the handover instruction instructs the terminal to be handed over from the first access device to a second access device.

10. The network device according to claim 1, wherein the terminal type comprises at least one of a manufacturer and a terminal model of the terminal.

11. A communications device, comprising:

at least one processor; and one or more memories coupled to the at least one processor and storing programming instructions, wherein the at least one processor is configured to execute the programming instructions to cause the communications device to:

generate a data packet, wherein an internet protocol (IP) packet header of the data packet comprises terminal information; and send the data packet, and wherein the IP packet header further comprises a type identifier, the type identifier indicates a type of the terminal information, and the type of the terminal information comprises a media access control (MAC) address and/or an international mobile equipment identity (IMEI).

12. The communications device according to claim 11, wherein a base packet header or an extension packet header of the IP packet header comprises the terminal information.

13. The communications device according to claim 12, wherein the extension packet header comprises a hop-by-hop options header and/or a destination options header.

14. The communications device according to claim 11, wherein the terminal information comprises an organizationally unique identifier.

15. A network system, comprising a network device and a communications device, the communications device comprising:

at least one processor; and one or more memories coupled to the at least one processor and storing programming instructions, wherein the at least one processor is configured to execute the programming instructions to cause the communications device to:

generate a data packet, wherein an internet protocol (IP) packet header of the data packet comprises terminal information; and send the data packet;

the network device comprising:

at least one processor; and one or more memories coupled to the at least one processor and storing programming instructions, wherein the at least one processor is configured to execute the programming instructions to cause the network device to:

receive the data packet from the communications device; and determine, based on the terminal information, a terminal type of a terminal corresponding to the terminal information, wherein the IP packet header further comprises a type identifier, the type identifier indicates a type of the terminal information, and the type of the terminal information comprises a media access control (MAC) address and/or an international mobile equipment identity (IMEI).

16. The network system according to claim 15, wherein a base packet header or an extension packet header of the IP packet header comprises the terminal information.

17. The network system according to claim 16, wherein the extension packet header comprises a hop-by-hop options header and/or a destination options header.

18. The network system according to claim 15, wherein the IP packet header further comprises a type identifier, the type identifier indicates a type of the terminal information, and the type of the terminal information comprises a media access control (MAC) address and/or an international mobile equipment identity (IMEI).

19. The network system according to claim 15, wherein the terminal information comprises an organizationally unique identifier.

* * * * *